(12) United States Patent
Hatahori et al.

(10) Patent No.: US 11,226,294 B2
(45) Date of Patent: Jan. 18, 2022

(54) DEFECT INSPECTION APPARATUS

(71) Applicant: Shimadzu Corporation, Kyoto (JP)

(72) Inventors: Takahide Hatahori, Kyoto (JP); Kenji Takubo, Kyoto (JP); Koki Yoshida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 76 days.

(21) Appl. No.: 16/920,148

(22) Filed: Jul. 2, 2020

(65) Prior Publication Data
US 2021/0080399 A1  Mar. 18, 2021

(30) Foreign Application Priority Data

Sep. 18, 2019 (JP) .............................. JP2019-169774

(51) Int. Cl.
| | |
|---|---|
| *G01B 9/02* | (2006.01) |
| *G01N 21/88* | (2006.01) |
| *G01N 21/45* | (2006.01) |
| *G06T 5/00* | (2006.01) |
| *G06T 5/20* | (2006.01) |
| *G06T 7/00* | (2017.01) |

(52) U.S. Cl.
CPC ......... *G01N 21/8851* (2013.01); *G01N 21/45* (2013.01); *G06T 5/003* (2013.01); *G06T 5/20* (2013.01); *G06T 7/0002* (2013.01); *G01N 2021/8887* (2013.01); *G01N 2201/0636* (2013.01); *G01N 2201/06113* (2013.01); *G06T 2207/10024* (2013.01); *G06T 2207/30168* (2013.01)

(58) Field of Classification Search
CPC ..... G01B 9/02; G01J 11/00; G01J 9/02; G01J 9/0246; G01N 21/45

USPC .......................................................... 356/450
See application file for complete search history.

(56) References Cited

U.S. PATENT DOCUMENTS

2005/0057757 A1* 3/2005 Colonna De Lega ...................... G03F 9/7088 356/497
2017/0350690 A1 12/2017 Hatahori et al.

FOREIGN PATENT DOCUMENTS

| EP | 1239261 A2 | 9/2002 |
|---|---|---|
| JP | 2007-024674 A | 2/2007 |
| JP | 2017-219318 A | 12/2017 |

OTHER PUBLICATIONS

Extended European Search Report (EESR) dated Dec. 7, 2020, for corresponding European patent application No. 20182786.2 (8 pages).
Rosso V. et al., "Simultaneous strain and coherent imaging using coupled photorefractive holography and shearography through scattering media," Journal of Biomedical Optics, Jul./Aug. 2008, vol. 13, No. 4, pp. 044010-1044010-7 (7 pages).

* cited by examiner

*Primary Examiner* — Md M Rahman
(74) *Attorney, Agent, or Firm* — Muir Patent Law, PLLC

(57) ABSTRACT

A defect inspection apparatus generates a surface layer inspection image which is an image representing displacement of an inspection target in a measurement region based on an intensity pattern of interfered laser light. The defect inspection apparatus is configured to generate an appearance inspection image which is an image of an outer surface of the measurement region based on an intensity pattern of incoherent light.

24 Claims, 13 Drawing Sheets

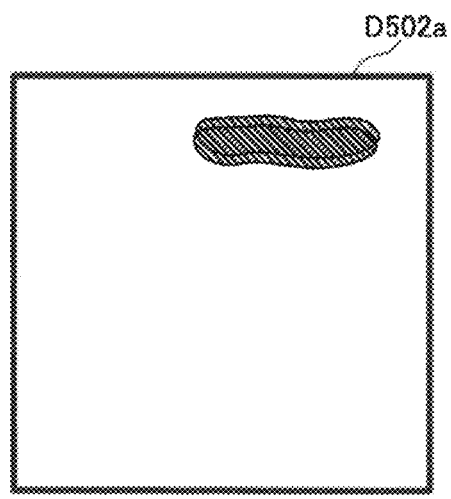 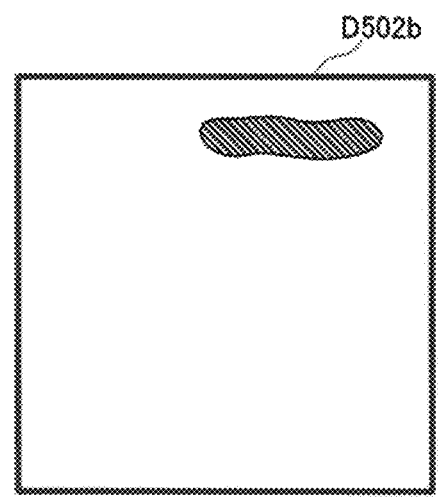
FIG. 13A  FIG. 13B

DEFECT INSPECTION APPARATUS

CROSS-REFERENCE TO RELATED APPLICATIONS

The priority application number JP2019-169774, entitled "Defect Inspection Apparatus," filed on Sep. 18, 2019, and invented by Takahide Hatahori, Kenji Takubo, and Koki Yoshida, upon which this patent application is based is hereby incorporated by reference.

BACKGROUND OF THE INVENTION

Field of the Invention

The present invention relates to a defect inspection apparatus.

Description of the Background Art

Conventionally, a defect inspection apparatus using laser interferometry has been known. Such a defect inspection apparatus is disclosed in, for example, Japanese Unexamined Patent Application Publication No. 2007-024674.

The Japanese Unexamined Patent Application Publication No. 2007-024674 discloses a surface/surface-layer inspection apparatus configured to evaluate a defect of an inspection target by measuring the displacement of an inspection target surface by laser interferometry by applying heat to the inspection target. The surface/surface-layer inspection apparatus described in the above-mentioned Japanese Unexamined Patent Application Publication No. 2007-024674 locally heats a surface of an inspection target to cause a heat strain on the surface of the inspection target. At this time, in cases where a defective part, such as, e.g., cracks and peeling, is present in the inspection target, the heat strain at the defective part becomes large, so that displacement occurs on the inspection target surface. The surface/surface-layer inspection apparatus described in the aforementioned Japanese Unexamined Patent Application Publication No. 2007-024674 is configured to evaluate a defect of an inspection target by measuring generated displacement using laser interferometry.

Here, in addition to performing a surface layer defect inspection for inspecting a defect, such as, e.g., cracks and peeling, generated at an inside (surface/surface-layer) of an inspection target by measuring the displacement of the surface by laser interferometry, depending on an inspection target, in some cases, an appearance inspection for inspecting dirt, deposits, minute irregularities, and the like adhering to an outer surface of an inspection target is performed. Therefore, although not specifically described in the aforementioned Japanese Unexamined Patent Application Publication No. 2007-024674, it is conceivable to perform an appearance inspection of the inspection target by using a surface/surface-layer defect inspection apparatus using the laser interferometry described in the aforementioned Japanese Unexamined Patent Application Publication No. 2007-024674.

However, in cases where an appearance inspection is performed by the above-described conventional surface/surface-layer inspection apparatus, the image of the inspection target captured by irradiating laser light includes a dark-light spot (speckle) caused by the interference of laser light. Since this speckle greatly causes the deterioration of the image quality at the time of the appearance inspection, it is difficult to perform the appearance inspection using an image in which a speckle is generated captured by emitting laser light. For this reason, it is difficult to perform both a surface layer defect inspection and an appearance inspection using laser interferometry on an inspection target by using a single apparatus.

SUMMARY OF THE INVENTION

The present invention has been made to solve the above-mentioned problems, and an object of the present invention is to provide a defect inspection apparatus capable of performing both a surface layer defect inspection and an appearance inspection using laser interferometry by a single apparatus.

In order to achieve the above object, a defect inspection apparatus according to one aspect of the present invention includes:

a displacement unit configured to displace a measurement region of an inspection target;

a first irradiation unit configured to emit laser light to the measurement region;

a second irradiation unit configured to emit incoherent light defined as light which is incoherent to the measurement region;

a control unit configured to control irradiation by the first irradiation unit and the second irradiation unit;

an interference unit configured to cause interference of the laser light reflected at the measurement region by laser interferometry; and an imaging unit configured to image the interfered laser light and the incoherent light reflected at the measurement region, wherein a surface layer inspection image which is an image representing displacement of the inspection target in the measurement region is generated based on an intensity pattern of the interfered laser light imaged by the imaging unit, and an appearance inspection image which is an image of an outer surface of the measurement region is generated based on an intensity pattern of the incoherent light imaged by the imaging unit.

Note that the "incoherent light" refers to light having an amplitude and a phase that are not aligned, and means light having a property which is hard to observe interference.

In the defect inspection apparatus according to the above-described one aspect of the present invention, a first irradiation unit configured to emit laser light to a measurement region and a second irradiation unit configured to emit incoherent light defined as light which is incoherent to the measurement region are provided. Further, it is configured to generate a surface layer inspection image which is an image representing the displacement of the inspection target in the measurement region based on an intensity pattern of the interfered laser light captured by the imaging unit and generate an appearance inspection image which is an image of an outer surface of the measurement region based on an intensity pattern of the incoherent light captured by the imaging unit.

With this, it is possible to perform a surface layer defect inspection by using laser interferometry and an appearance inspection by using an image with no speckle captured by emitting the incoherent light. As a result, both the surface layer defect inspection and the appearance inspection using the laser interferometry can be performed by a single apparatus.

BRIEF DESCRIPTION OF THE DRAWINGS

FIG. 13A is a diagram for explaining an appearance inspection image according to a fifth embodiment, and is a diagram showing an image before image processing is performed.

FIG. 13B is a diagram for explaining an appearance inspection image according to a fifth embodiment, and is a diagram showing an image after image processing is performed.

DESCRIPTION OF PREFERRED EMBODIMENTS

Hereinafter, some embodiments in which the present invention is embodied will be described with reference to the attached drawings.

First Embodiment (Configuration of Defect Inspection Apparatus)

Figure 1:
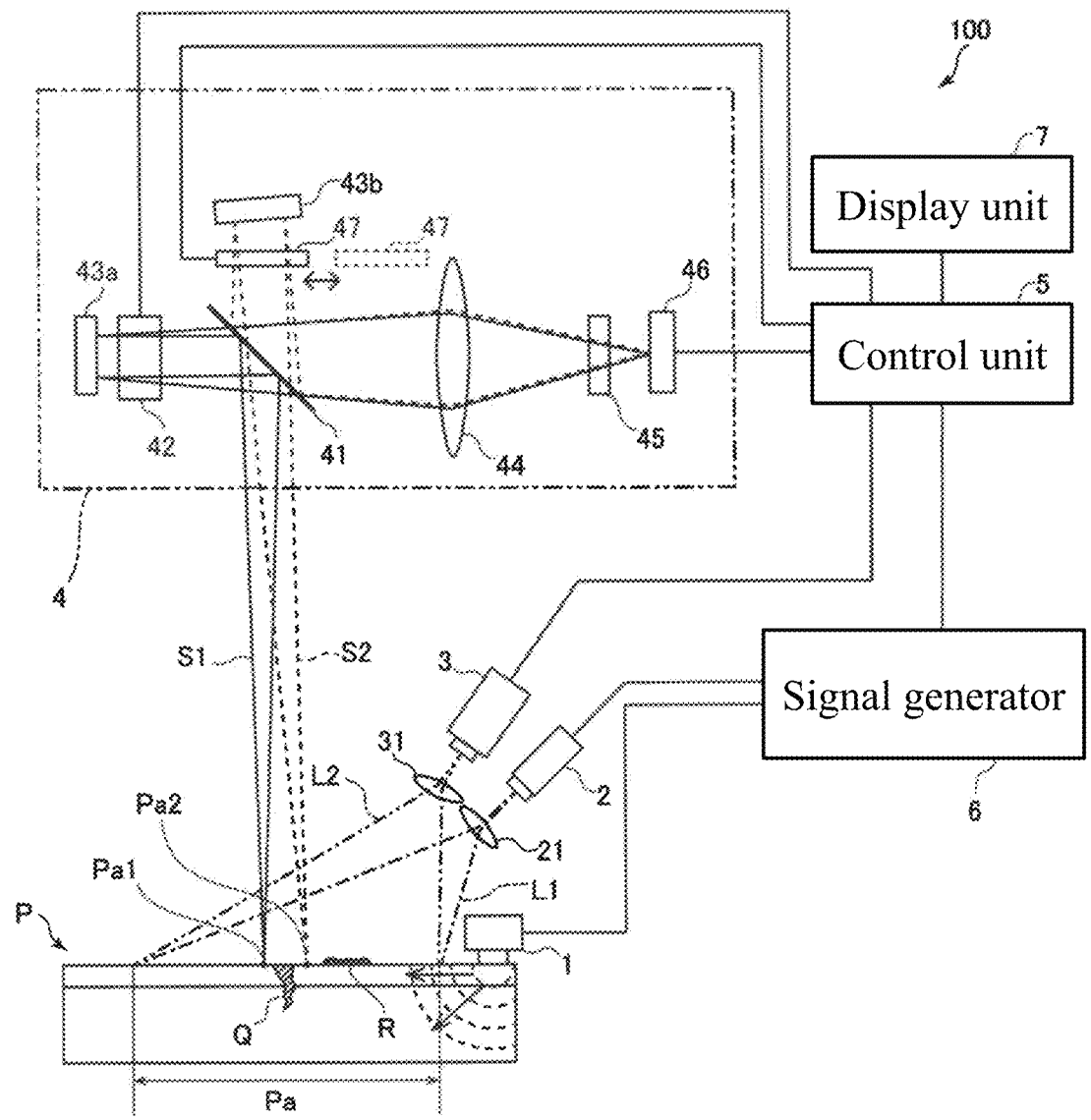
FIG. 1 is a diagram for explaining a configuration of a defect inspection apparatus according to a first embodiment.

Referring to FIG. 1, an entire configuration of a defect inspection apparatus 100 according to a first embodiment of the present invention will be described.

As shown in FIG. 1, the defect inspection apparatus 100 according to the first embodiment is provided with a vibrator 1, a first irradiation unit 2, a second irradiation unit 3, a speckle shearing interferometer 4, a control unit 5, a signal generator 6, and a display unit 7.

Note that the vibrator 1 is an example of the "displacement unit" recited in claims, and the speckle/shearing interferometer 4 is an example of the "interference unit" recited in claims.

The vibrator 1 and the first irradiation unit 2 are connected to a signal generator 6 via a cable.

The vibrator 1 causes displacement of a measurement region Pa of an inspection target P. Specifically, the vibrator 1 excites elastic waves in the measurement region Pa. That is, the vibrator 1 is arranged so as to be in contact with the inspection target P, and is configured to convert an AC signal from the signal generator 6 into mechanical vibrations to excite elastic waves in the measurement region Pa.

The first irradiation unit 2 emits laser light L1 to the measurement region Pa. The first irradiation unit 2 includes a laser light source which is not shown. The laser light L1 emitted from the laser light source is diffused by the first illumination light lens 21 to be emitted to the surface of the entire measurement region Pa of the inspection target P. Further, the first irradiation unit 2 emits the laser light L1 at a predetermined timing based on an electric signal from the signal generator 6. That is, the first irradiation unit 2 emits the laser light L1 to the inspection target P corresponding to the elastic wave by the vibrator 1. The laser light source is, for example, a laser diode and emits laser light L1 (near infrared light) having a wavelength of 785 nm.

The second irradiation unit 3 emits incoherent light L2 defined as light which is incoherent to the measurement region Pa. Here, in this embodiment, the second irradiation unit 3 emits the incoherent light L2 including light having a wavelength (wavelength of 785 nm) equal to the wavelength of the laser light L1 emitted by the first irradiation unit 2. That is, the incoherent light L2 includes light in the same wavelength band as the light L1. The incoherent light L2 emitted from the second irradiation unit 3 is diffused by the second illumination light lens 31 to irradiate the entire measurement region Pa of the surface of the inspection target P. The second irradiation unit 3 is, for example, an LED (Light Emitting Diode), and is configured such that the incoherent light has a center wavelength within a range of equal to or larger than 780 nm and equal to or less than 800 nm.

The speckle/shearing interferometer 4 is configured to cause interference of the laser light L1 reflected at the measurement region Pa by laser interferometry. The speckle/shearing interferometer 4 is configured to measure the displacement of the inspection target P in the measurement region Pa using a method (Shearography method) that causes interference of the laser light L1 reflected at mutually different two points of the measurement region Pa excited by the vibrator 1. The speckle/shearing interferometer 4 includes a beam splitter 41, a phase shifter 42, a first reflecting mirror 43a, a second reflecting mirror 43b, a condenser lens 44, and a bandpass filter 45, which are optical members arranged on the optical path of the laser light L1. The speckle/shearing interferometer 4 further includes an image sensor 46 and a shutter 47.

Note that the image sensor 46 is an example of the "imaging unit" recited in claims, and the bandpass filter 45 is an example of the "optical filter" recited in claims. Further, the shutter 47 is an example of the "blocking unit" recited in claims.

The beam splitter 41 includes a half mirror. The beam splitter 41 is arranged at the position where the laser light L1 and the incoherent light L2 reflected at the measurement region Pa of the inspection target P enter. The beam splitter 41 reflects the incident laser light L1 and the incoherent light L2 to the phase shifter 42 as shown in the optical path indicated by the solid line S1 in FIG. 1, and transmits the incident laser light L1 and the incoherent light L2 toward the second reflecting mirror 43b along the optical path shown by the broken line S2 in FIG. 1. Further, the beam splitter 41 transmits the incident laser light L1 and the incoherent light L2 reflected by the first reflecting mirror 43a toward the condenser lens 44 as shown in the optical path indicated by the solid line S1 in FIG. 1, and reflects the laser light L1 and the incoherent light L2 reflected by the second reflecting mirror 43b toward the condenser lens 44 as indicated by the broken line S2 in FIG. 1.

The first reflecting mirror 43a is arranged on the optical path of the laser light L1 and the incoherent light L2 reflected by the beam splitter 41 at 45 degrees with respect to the reflective surface of the beam splitter 41. The first reflecting mirror 43a reflects the laser light L1 and the incoherent light L2 reflected by the beam splitter 41 toward the beam splitter 41.

The second reflecting mirror 43b is arranged on the optical path of the laser light L1 and the incoherent light L2 that transmit the beam splitter 41 at an angle slightly inclined from the angle of 45 degrees with respect to the reflective surface of the beam splitter 41. The second reflecting mirror 43b reflects the incident laser light L1 and incoherent light L2 transmitted through the beam splitter 41 toward the beam splitter 41.

The phase shifter 42 is arranged between the beam splitter 41 and the first reflecting mirror 43a and shifts the phase of the laser light L1 that passes therethrough by the control of the control unit 5. Specifically, the phase shifter 42 is configured to change the optical path length of the laser light L1 that passes therethrough.

The image sensor 46 is provided with a large number of sensing elements, and is arranged on the optical path of the laser light L1 and the incoherent light L2 (solid line S1 in FIG. 1) reflected by the first reflecting mirror 43a after being reflected by the beam splitter 41 and transmitted the beam splitter 41 and the laser light L1 and the incoherent light L2 (broken line S2 in FIG. 1) reflected by the second reflecting mirror 43b after being transmitted by the beam splitter 41 and reflected by the beam splitter 41. The image sensor 46 includes, for example, a CMOS image sensor or a CCD image sensor.

The condenser lens 44 is arranged between the beam splitter 41 and the image sensor 46 and collects the laser light L1 and the incoherent light L2 transmitted through the beam splitter 41 (solid line S1 in FIG. 1) and the laser light L1 and the incoherent light L2 reflected by the beam splitter 41 (broken line S2 in FIG. 1).

The bandpass filter 45 is arranged between the condenser lens 44 and the image sensor 46. The bandpass filter 45 transmits light having a predetermined wavelength. The bandpass filter 45 is configured to not transmit (configured to attenuate) light not having the predetermined wavelength. The bandpass filter 45 includes, for example, a dielectric multilayer film and is configured to have a center wavelength of 785 nm. That is, the bandpass filter 45 is configured to transmit the light included in the laser light L1 and the light included in the incoherent light L2.

The shutter 47 blocks either one optical path of mutually different two optical paths through which the laser light L1 and the incoherent light L2 reflected at mutually different two points pass. Specifically, the shutter 47 is configured to switch between a state (solid line in FIG. 1) in which the optical path (broken line S2 in FIG. 1) between the beam splitter 41 and the second reflecting mirror 43b is blocked and a state (broken line in FIG. 1) in which the optical path is opened by the control by the control unit 5 which will be described later.

In the speckle/shearing interferometer 4 using a Shearography method, for example, the laser light L1 (solid line S1 in FIG. 1) reflected by the position Pa1 on the surface of the measurement region Pa and the first reflecting mirror 43a and the laser light L1 (broken line S2 in FIG. 1) reflected by the positions Pa2 on the surface of measurement region Pa and the second reflecting mirror 43b interfere with each other and enter the same portion of the image sensor 46. The position Pa1 and the position Pa2 are positions spaced apart from each other by a minute distance. The laser light L1 reflected from the different positions in each region of the measurement region Pa is guided by the speckle/shearing interferometer 4 and enters the image sensor 46.

Here, in this embodiment, it is configured such that a part of the optical path of the laser light L1 and a part of the optical path of the incoherent light L2 are common, and the image sensor 46 performs imaging using the common optical members. That is, the incoherent light L2 emitted by the second irradiation unit 3 passes through the optical members arranged on the optical path of the laser light L1 and irradiated by the first irradiation unit 2 and is imaged by the image sensor 46. In other words, common optical members are arranged on the optical path of the laser light L1 and the incoherent light L2.

Further, the image sensor 46 images the interfered laser light L1 and the incoherent light L2 reflected at the measurement region Pa. In other words, the interfered laser light L1 and the incoherent light L2 reflected at the measurement region Pa are imaged by the common image sensor 46. Note that the interfered laser light L1 and the incoherent light L2 reflected at the measurement region Pa include light having a wavelength that can pass through the common bandpass filter 45.

The control unit 5 controls the irradiation by the first irradiation unit 2 and the second irradiation unit 3. Further, the control unit 5 is configured to generate a surface layer inspection image D1 (see FIG. 2) which is an image representing the displacement of the inspection target P in the measurement region Pa based on the intensity pattern of the interfered laser light L1 imaged by the image sensor 46 and generate an appearance inspection image D2 (see FIG. 3) which is an image of the outer surface of the measurement region Pa based on the intensity pattern of the incoherent light L2 imaged by the image sensor 46.

The control related to the generation of the surface layer inspection image D1 and the appearance inspection image D2 by the control unit 5 will be described later.

Further, the control unit 5 is configured such that the timing of causing the image sensor 46 to image the laser light L1 by causing the first irradiation unit 2 to emit the laser light L1 and the timing of causing the image sensor 46 to image the incoherent light L2 by causing the second irradiation unit 3 to emit the incoherent light L2 are different from each other. Further, the control unit 5 is configured to cause the image sensor 46 to image the incoherent light L2 by causing the second irradiation unit 3 to emit the incoherent light L2 in a state in which the operation of the vibrator 1 is stopped. Further, the control unit 5 is configured to cause the image sensor 46 to image the incoherent light L2 by causing the second irradiation unit 3 to emit the incoherent light using the other optical path (solid line S1 in FIG. 1) in a state in which one optical path (the broken line S2 in FIG. 1) of the mutually different two optical paths (the solid line S1 and the broken line S2 in FIG. 1) is blocked by the shutter 47.

The signal generator 6 emits a signal for controlling the vibration of the vibrator 1 and the timing of the irradiation of the laser light L1 of the first irradiation unit 2 by the control unit 5.

The display unit 7 displays the surface layer inspection image D1 and the appearance inspection image D2 generated by the control unit 5. The display unit 7 includes a liquid crystal display or an organic EL (electroluminescence) display.

The inspection target P is a coated steel plate in which a coating film is applied on a steel plate. The defective part Q is a defective part that is generated at the inside (surface layer/surface) of the measurement region Pa and includes cracks S and peeling. Further, the defective part R is a defective part that is generated on the outer surface of the measurement region Pa and is represented by dirt, a deposit, a minute unevenness, or the like that adhered to the outer surface.

(Control to Generate Surface Layer Inspection Image)

Figure 2:
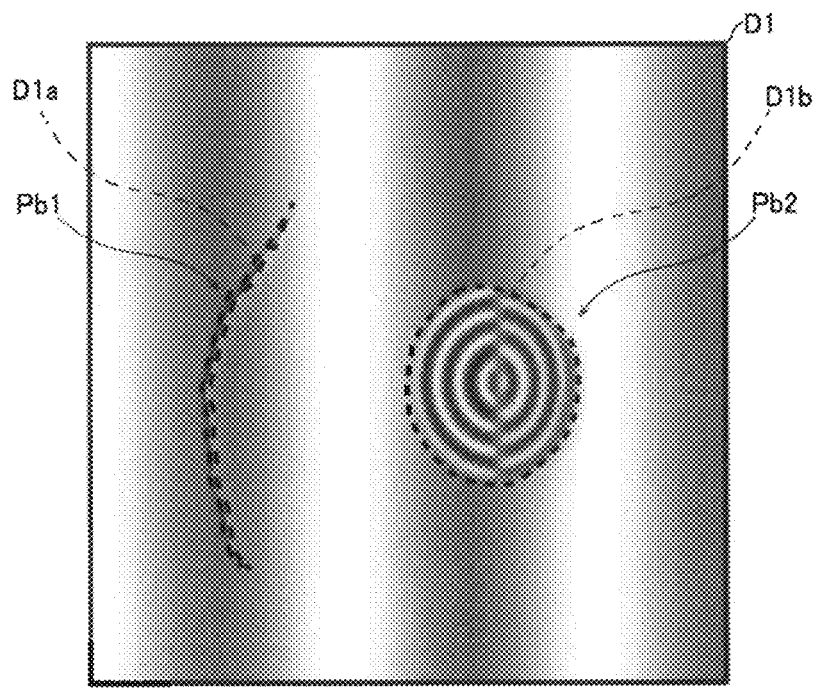
FIG. 2 is a diagram for explaining a surface layer inspection image according to a first embodiment.

As shown in FIG. 2, the surface layer inspection image D1 is configured so that a position (the position Pb1 and the position Pb2 in FIG. 2) determined to be the position of the defective part Q generated inside the measurement region Pa can be visually recognized. That is, the surface layer inspection image D1 visually represents the vibration state of the inspection target P excited by the vibrator 1, and is configured so as to be visually recognizable as the position of the defective part Q in which the region in which the vibration state is discontinuous is generated.

The control unit 5 actuates the phase shifter 42 arranged in the speckle/shearing interferometer 4 by an actuator (not shown) to change the phase of the laser light L1 transmitted therethrough. With this, the phase difference of the laser light L1 (see, the solid line S1 in FIG. 1) reflected at the position Pa1 and the laser light L1 (see, the broken line S2 in FIG. 1) reflected at the position Pa2 changes. Each detection element of the image sensor 46 detects the intensity of the interference light in which two laser light L1 interferes.

The control unit 5 controls the vibration of the vibrator 1 and the timing of the emission of the laser light L1 of the first irradiation unit 2 via the signal generator 6, and captures a plurality of interference images D0 (not shown) while changing the phase shift amount. The phase shift amount is changed by $\lambda/4$, and a total of 37 pieces of interference images D0 including 32 pieces of interference images D0 corresponding to the timings j (j=0 to 7) of the laser irradiation and 5 pieces of interference images D0 when the laser light is off before and after each phase shift amount (0, $\lambda/4$, $\lambda/2$, and $3\lambda/4$) is captured while changing the phase shift amount by $\lambda/4$. Note that $\lambda$ denotes a wavelength of the laser light L1.

The control unit 5 processes the detected detection signal based on the intensity pattern of the interfered laser light L1 imaged by the image sensor 46 in the following procedures to obtain a surface layer inspection image D1 representing the state of vibrations.

The control unit 5 obtains an optical phase (the phase difference between two optical paths when the phase shift amount is zero) $\Phi_j$ by Expression (1) from the luminance values $I_{j0}$ to $I_{j3}$ of interference images D0 (4 images) in which the timing j (j=0 to 7) for emitting the laser light L1 is the same and the phase shift amount is different by $\lambda/4$.

$$\Phi_j = \arctan\{(I_{j3}-I_{j1})/(I_{j2}-I_{j0})\} \qquad (1)$$

Further, the control unit 5 performs the sine wave approximation on the optical phase $\Phi_j$ by a least-squares method to obtain the approximation coefficients A, θ, and C in Expression (2).

$$\Phi_j = A\cos(\theta+j\pi/4)+C = B\exp(j\pi/4)+C \qquad (2)$$

where B is a complex amplitude and is expressed by Expression (3).

$$B = A\exp(i\theta): \text{Cmplex amplitude} \qquad (3)$$

Further, the control unit 5 configures and outputs a moving image (30 to 60 frames) that displays an optical phase change at the respective phase times ζ (0≤ζ<2π) of vibrations from the approximate expression obtained by subtracting the constant term C from Expression (2). In the above procedure, a spatial filter is appropriately applied to the complex amplitude B in order to remove noise. The phase shift amount and the Step of the timing of emitting the laser light L1 are not limited to the above. In this case, the calculation expression is different from the Expressions (1) to (3).

The control unit 5 applies a spatial filter to detect, from the above-described moving image, a discontinuous region in a vibrational state as a defective part Q generated inside the inspection target P. Then, a surface layer inspection image D1 including an extracted image D1a and an extracted image D1b which are images extracted from the detected region is displayed. Note that in cases where the shape of the inspection target P itself includes unevenness, even at the boundary between the plane portion and the uneven portion, there is a case where discontinuous of the vibrating state occurs. For this reason, the control unit 5 may be configured to detect an internally occurred defective part Q based on the shape information of the inspection target P so as not to detect it as a defect.

(Control to Generate Appearance Inspection Image)

Figure 3:
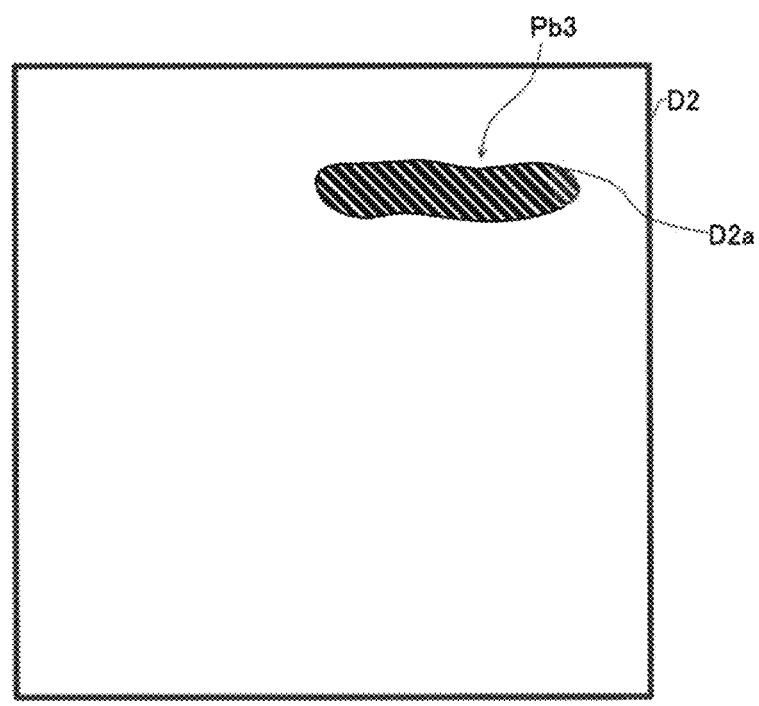
FIG. 3 is a diagram for explaining an appearance inspection image according to a first embodiment.

As shown in FIG. 3, the appearance inspection image D2 is configured so that a position (the position Pb3 in FIG. 3) determined to be the position of the defective part R of the measurement region Pa occurred on the outer surface can be visually recognized. That is, the appearance inspection image D2 is configured to be able to determine the position of the defective part R occurred on the outer surface by performing image processing on the image captured by irradiating the outer surface of the measurement region Pa with the incoherent light L2 and visually recognize the determined position (the position Pb3 in FIG. 3). The measurement region Pa in the surface layer inspection image D1 and the measurement region Pa in the appearance inspection image D2 are substantially the same region.

The control unit 5 generates the detected detection signal as an image based on the intensity pattern of the incoherent light L2 captured by the image sensor 46 and performs image processing on the generated image. For example, it is configured such that the position of the defective part R occurred on the outer surface is determined based on the difference value between the luminance values of the pixels. Then, the control unit 5 displays the appearance inspection image D2 including an image D2a in which the position determined to be a defective part R is emphasized.

(Control Regarding Display on Display Unit)

Figure 4:
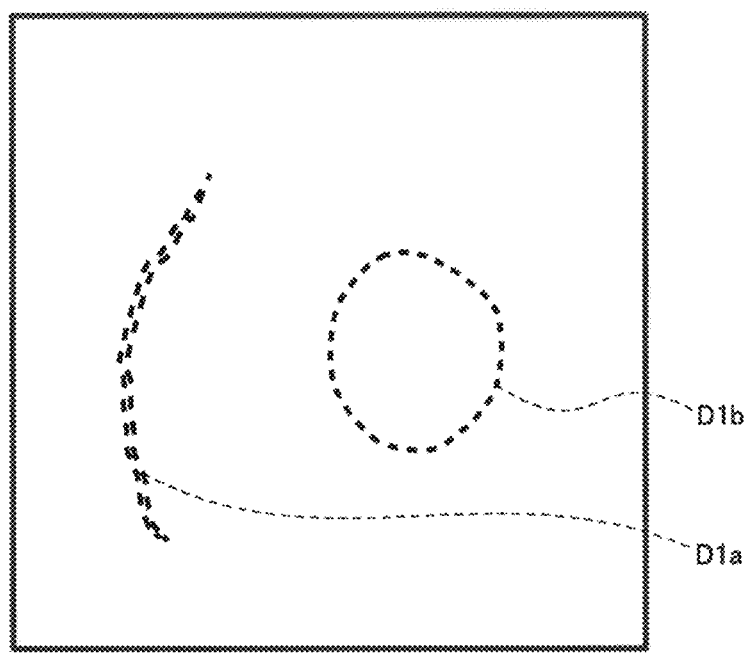
FIG. 4 is a diagram for explaining an extracted image according to a first embodiment.
Figure 5:
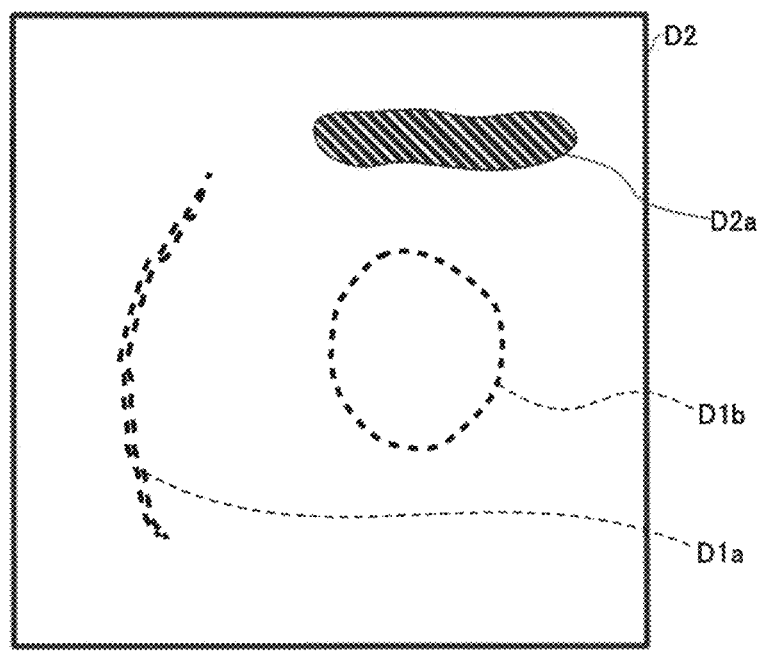
FIG. 5 is a diagram for explaining an appearance inspection image in which the extracted image by the first embodiment is superimposed.

The control unit 5 performs control of displaying the surface layer inspection image D1 and the appearance inspection image D2 on the display unit 7. Further, as shown in FIG. 4 and FIG. 5, the control unit 5 superimposes the image emphasizing the positions determined to be the positions of the internally occurred defective parts Q in the measurement region Pa on the appearance inspection image D2 and displays the superimposed image on the display unit 7. That is, with respect to the positions of the internally occurred defective parts Q, the extracted images D1a and D1b, which are images each obtained by extracting the contour, are superimposed on the appearance inspection image D2 and displayed on the display unit 7.

Figure 6:
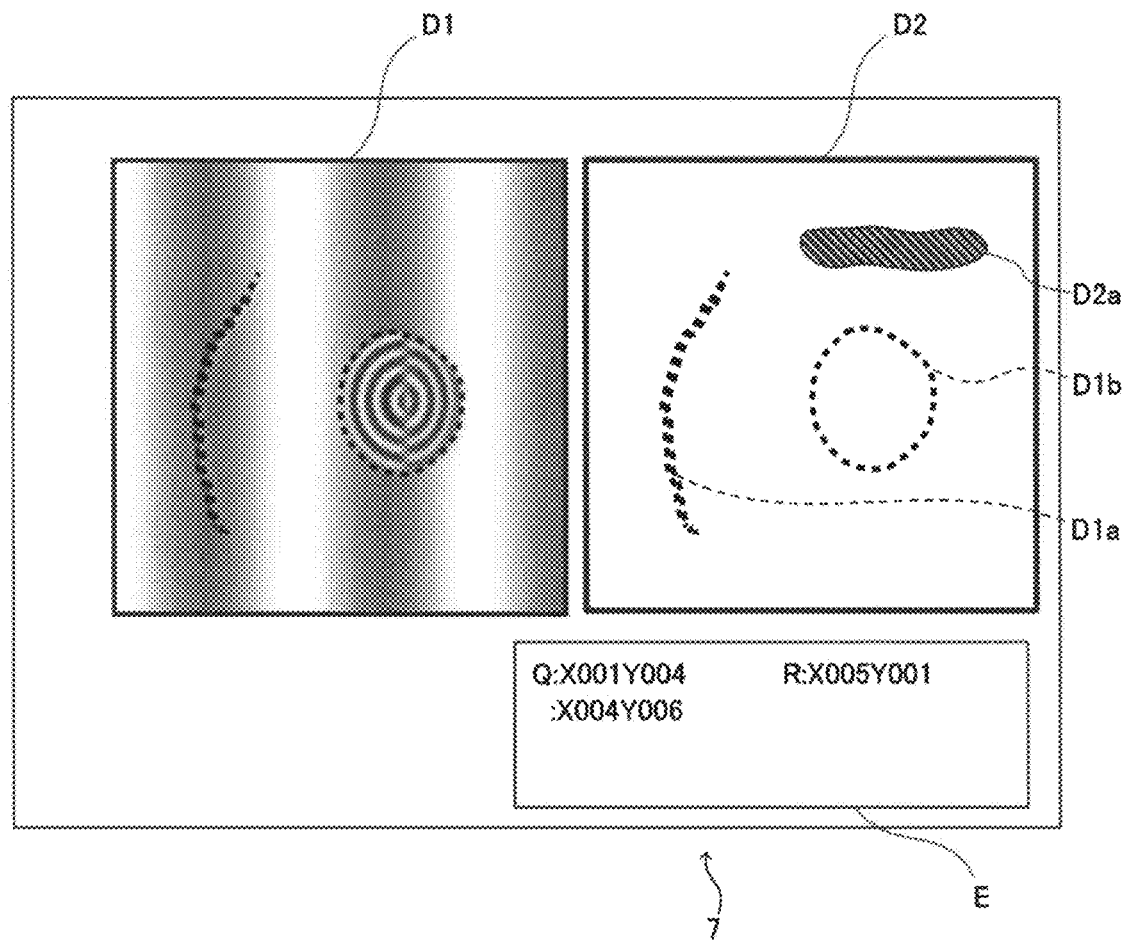
FIG. 6 is a diagram for explaining a display of a display unit according to a first embodiment.

Further, as shown in FIG. 6, the control unit 5 performs control of displaying the surface layer inspection image D1 and the appearance inspection image D2 side by side on the display unit 7.

The control unit 5 is configured to generate the position data E for each of the positions determined to be the position of the internally occurred defective part Q within the measurement region Pa and the position determined to be the position of the defective part R occurred on the outer surface. Specifically, as shown in FIG. 6, the control unit 5 displays the surface layer inspection image D1, the appearance inspection image D2, and the position data E together on the display unit 7. Further, for the purpose of making it possible to distinguish each of the internally occurred defective part Q and the externally occurred defective part R, for example, a color corresponding to each part is used to display. That is, the control unit 5 is configured to output a report on the internally occurred defective part Q and the defective part R occurred on the outer surface.

Control Processing by Defect Inspection Apparatus 100 of First Embodiment

Figure 7:
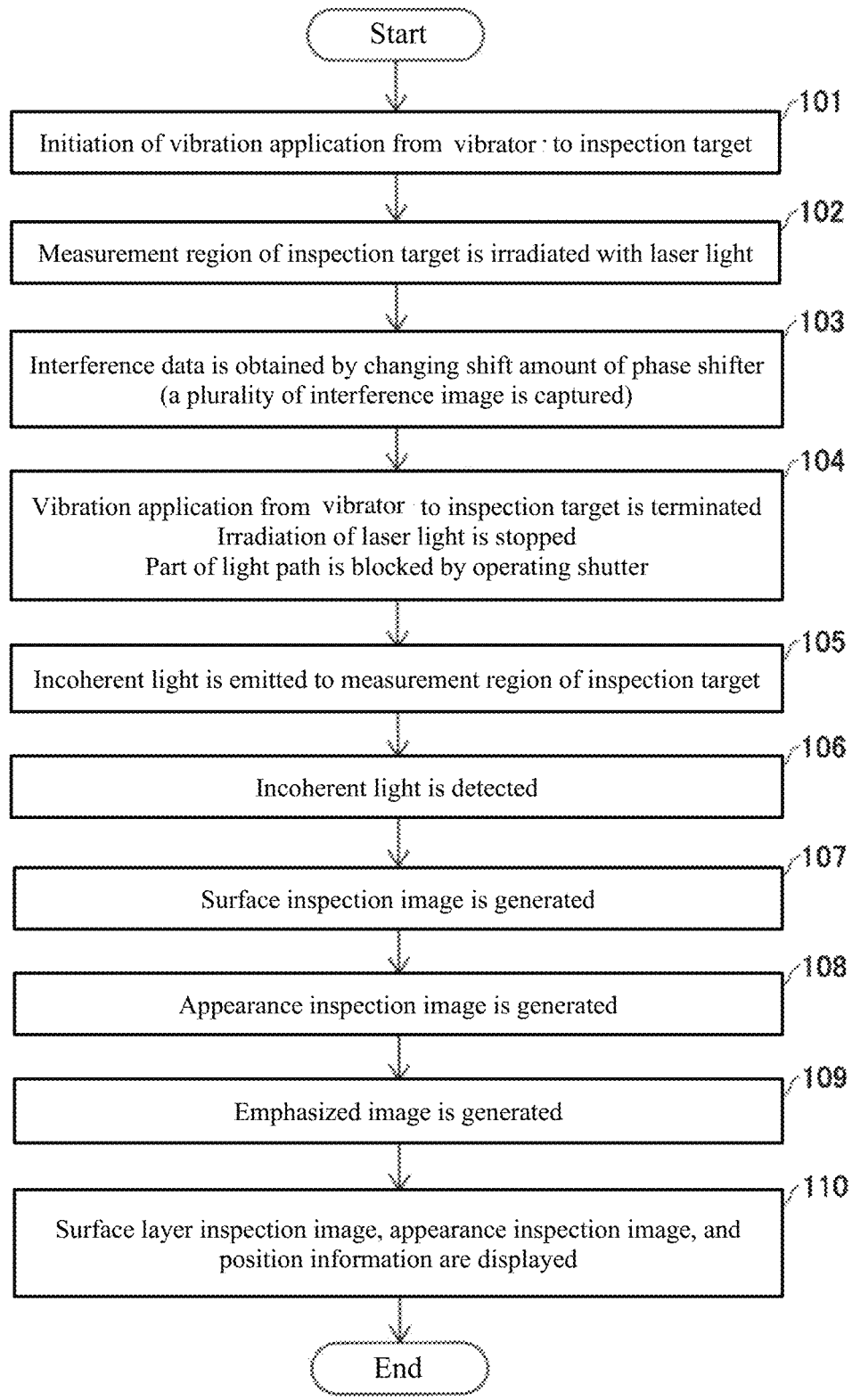
FIG. 7 is a flowchart for explaining control of a control unit according to a first embodiment.

Next, referring to FIG. 7, the control processing flow on the surface layer defect inspection and the appearance inspection by the defect inspection apparatus 100 according to the first embodiment will be described. The control on the surface layer defect inspection and the appearance inspection by this defect inspection apparatus 100 is performed by the control unit 5.

First, in Step 101, the application of vibrations from the vibrator 1 to the inspection target P is initiated. With this, an elastic wave is excited in the measurement region Pa of the inspection target P.

Next, in Step 102, the laser light L1 is emitted from the first irradiation unit 2 to the measurement region Pa.

Next, in Step 103, the interference data is acquired while changing the shift amount of the phase shifter 42. That is, a plurality of interference images D0 interfered by shifting the phase is acquired. With this, the phase shifter 42 of the speckle/shearing interferometer 4 is operated so that the phase of the laser light L1 changes by λ/4, and the intensity of the interference light of the laser light L1 at each phase is detected (imaged) by the image sensor 46.

Next, in Step 104, the application of vibrations from the vibrator 1 to the inspection target P is terminated. Further, the irradiation of the laser light L1 by the first irradiation unit 2 is stopped. Then, by operating the shutter 47, a part of the optical path of the laser light L1 (see, the solid line S1 in FIG. 1) is blocked.

Next, in Step 105, the incoherent light L2 is emitted from the second irradiation unit 3 to the measurement region Pa.

Next, in Step 106, the incoherent light L2 is detected (imaged) by the image sensor 46. In other words, the timing at which the laser light L1 is imaged by the image sensor 46 by the irradiation of the laser light L1 from the first irradiation unit 2 and the timing at which the incoherent light L2 is imaged by the image sensor 46 by the irradiation of the incoherent light L2 from the second irradiation unit 3 differ from each other. Further, in a state in which the operation of the vibrator 1 is stopped, the incoherent light L2 is emitted from the second irradiation unit 3, and the incoherent light L2 is imaged by the image sensor 46. Then, in a state in which one of the (see, the broken line S2 in FIG. 1) of the mutually different two optical paths (see, the solid line S1 and the broken line S2 in FIG. 1) is blocked by the shutter 47, the incoherent light L2 is emitted by the second irradiation unit 3 using the other optical path (see, the sold line S1 in FIG. 1), and the incoherent light L2 is imaged by the image sensor 46.

Next, in Step 107, vibration discontinuous portions of the inspection target P in the measurement region Pa are extracted based on a plurality of interference images D0 (not shown), and a surface layer inspection image D1 visually representing the vibration condition of the inspection target P is generated.

Next, in Step 108, an appearance inspection image D2 (see FIG. 3) is generated based on the intensity pattern of the imaged incoherent light L2.

Next, in Step 109, extracted images D1a and D1b, which are images obtained by extracting the contours of the vibration discontinuous portions, are generated.

Next, in Step 110, the surface layer inspection image D1, the appearance inspection image D2, and the position data E are displayed on the display unit 7. Thereafter, the processing of the surface layer defect inspection and the processing of the appearance inspection processing are terminated in accordance with a termination instruction input or the like from the operator.

It should be noted that either the processing of capturing the incoherent light L2 and generating the appearance inspection image D2 in Step 104 to Step 106, and Step 108 or the processing of generating the surface layer inspection image D1 and the processing of generating the extracted image D1a (and D1b) in Step 107 and Step 109 may be performed first.

Effects of First Embodiment

In this first embodiment, the following effects can be obtained.

As described above, the defect inspection apparatus 100 according to the first embodiment includes the vibrator 1 (displacement unit) configured to displace the measurement region Pa of the inspection target P, the first irradiation unit 2 configured to irradiate the measurement region Pa with the laser light L1, the second irradiation unit 3 configured to irradiate the measurement region Pa with the incoherent light defined as light which is incoherent, the control unit 5 configured to control the irradiation by the first irradiation unit 2 and the second irradiation unit 3, the speckle/shearing interferometer 4 (interference unit) configured to cause interference of the laser light L1 reflected at the measurement region Pa by laser interferometry, and the image sensor 46 (imaging unit) configured to image the interfered laser light L1 and the incoherent light L2 reflected at the measurement region Pa. The defect inspection apparatus 100 is configured such that the surface layer inspection image D1 which is an image representing the displacement of the inspection target P in the measurement region Pa is generated based on the intensity pattern of the interfered laser light L1 imaged by the image sensor 46, and the appearance inspection image D2 which is the image of the outer surface of the measurement region Pa based on the intensity pattern of the incoherent light L2 imaged by the image sensor 46.

Further, in the defect inspection apparatus 100 of the first embodiment, as described in the above configuration, the apparatus is provided with the first irradiation unit 2 that emits the laser light L1 to the measurement region Pa and the second irradiation unit 3 that emits the incoherent light L2 defined as light which is incoherent to the measurement region Pa. Further, it is configured to generate the surface layer inspection image D1, which is an image representing the displacement of the inspection target P in the measurement region Pa based on the intensity pattern of the interfered laser light L1 captured by the image sensor 46 and generate the appearance inspection image D2, which is the image of the outer surface of the measurement region Pa based on the intensity pattern of the incoherent light L2 captured by the image sensor 46. As a result, it is possible to perform the surface layer defect inspection by using laser interferometry and the appearance inspection by using the image in which speckles imaged by emitting the incoherent light L2 do not occur. As a result, both the surface layer defect inspection and the appearance inspection using laser interferometry can be performed by a single apparatus.

Further, in the first embodiment, further effects can be obtained by the following configuration.

That is, in the first embodiment, the speckle/shearing interferometer 4 (interference unit) includes common optical members arranged on the optical path of the laser light L1 and the incoherent light L2. With this configuration, it becomes unnecessary to separately provide optical members for the laser light L1 and optical members for the incoherent light L2 in the speckle/shearing interferometer 4. As a result, even in cases where the surface layer defect inspection and the appearance inspection are performed together by one apparatus, it is possible to suppress an increase in the number of components.

Also, in the first embodiment, the second irradiation unit 3 is configured to emit the incoherent light L2 including light having a wavelength equal to the wavelength of the laser light L1 emitted by the first irradiation unit 2. With this configuration, even in cases where the speckle/shearing interferometer 4 is configured so that the laser interference is accurately performed based on the wavelength of the laser light L1, since the incoherent light L2 includes a wavelength equal to the wavelength of the laser light L1, the incoherent light L2 can be imaged using common optical members (bandpass filter, etc.). As a result, even in the case of performing the surface layer defect inspection and the appearance inspection together by a single apparatus, it is possible to suppress an increase in the number of components without reducing the accuracy of the laser interference.

Further, in the first embodiment, the laser interferometry is a method (Shearography method) for causing interference of the laser light L1 reflected at mutually different two points in the measurement region Pa, and is configured such that the optical path of a part of the laser light L1 and the optical path of a part of the incoherent light L2 are common. With this configuration, common optical members can be easily used in the portions where the optical paths are common. As a result, even in cases where the surface layer defect inspection and the appearance inspection are performed together by a single apparatus, it is possible to more easily suppress an increase in the number of components.

Further, in the first embodiment, the apparatus is further provided with the shutter 47 (blocking unit) for blocking either one optical path of the mutually different two optical paths through which the laser light L1 reflected at mutually different two points pass. The control unit 5 is configured to cause the image sensor 46 (imaging unit) to image the incoherent light L2 by causing the second irradiation unit 3 to emit the incoherent light L2 using the other optical path in a state in which one of two optical paths is blocked by the shutter 47.

Here, it is assumed that the second irradiation unit 3 is caused to emit the incoherent light L2 by using both the optical paths through which the laser light L1 reflected at mutually different two points pass. In such cases, since the incoherent light L2 reflected at mutually different two points are imaged on the image sensor 46, it is considered that the captured appearance inspection image D2 becomes double blurred, resulting in a degraded image. Considering this point, as in the above-described first embodiment, it is configured such that either one of optical paths is blocked by the shutter 47.

As a result, since the incoherent light L2 reflected at one point in the measurement region Pa is imaged, the appearance inspection image D2 does not appear to be doubly blurred, and a clear image can be obtained. As a result, even in cases where the laser interference is performed by using a method (Shearography method) of causing the interference of the laser light L1 reflected at mutually different two points of the measurement region Pa, the image quality of the appearance inspection image D2 can be suppressed from being deteriorated.

Further, in the first embodiment, the control unit 5 is configured so that the timing of causing the image sensor 46 (imaging unit) to image the laser light L1 by causing the first irradiation unit 2 to emit the laser light L1 and the timing of causing the image sensor 46 to image the incoherent light L2 by causing the second irradiation unit 3 to emit the incoherent light L2 are different from each other.

Here, in cases where the timing of causing the image sensor 46 to image the laser light L1 by causing the first irradiation unit 2 to emit the laser light L1 and the timing of causing the image sensor 46 to image the incoherent light L2 by causing the second irradiation unit 3 to emit the incoherent light L2 are performed simultaneously, it is considered that the incoherent light L2 affects as disturbing light at the time of causing the interference of the laser light L1 and therefore the surface layer inspection image D1 becomes blurred. Further, it is considered that the appearance inspection image D2 becomes also blurred since a speckle due to the laser light L1 occurs in the appearance inspection image D2 generated by causing the image sensor 46 to capture the image of the incoherent light L2.

Considering this point, by configuring as in the above-described first embodiment, even in cases where the surface layer defect inspection and the appearance inspection are performed together by a single apparatus, it becomes possible to suppress both the surface layer inspection image D1 and the appearance inspection image D2 from becoming blurred. As a result, both the surface layer defect inspection by the laser interference and the appearance inspection by the incoherent light L2 can be performed with high accuracy.

In the first embodiment, the control unit 5 is configured to cause the image sensor 46 (imaging unit) to image the incoherent light L2 by causing the second irradiation unit 3 to emit the incoherent light L2 in a state in which the operation of the vibrator 1 (displacement unit) is stopped. With this configuration, it is possible to suppress the appearance inspection image D2 from becoming blurred due to the fact that the vibrator 1 causes the inspection target P to vibrate.

Further, in the first embodiment, it is configured as follows. The apparatus is further provided with the display unit 7 for displaying an image. The control unit 5 performs control of displaying the surface layer inspection image D1 configured to visually recognize a position determined to be a position of a defective part Q occurred inside the measurement region Pa on the display unit 7, and also performs control of displaying the appearance inspection image D2 configured to visually recognize a position determined to be a position of a defective part R occurred on the outer surface of the measurement region Pa on the display unit 7.

With this configuration, the operator can visually recognize the position determined to be the position of the defective part Q occurred inside the measurement region Pa of the inspection target P and the position determined to be the position of the defective part R occurred on the outer surface. As a result, the operator can visually recognize the results of both the surface layer defect inspection and the appearance inspection more easily.

Further, in the first embodiment, the control unit 5 is configured to perform control of superimposing the extracted images D1a and D1b, which are images emphatically showing the position determined to be the position of the defective part Q occurred inside the measurement region Pa, on the appearance inspection image D2 to display them on the display unit 7.

By configuring as described above, the operator can visually recognize the position determined to be the position of the defective part Q occurred within the measurement region Pa of the inspection target P together with the image representing the appearance of the inspection target P. As a result, the operator can recognize the position of the defective part Q occurred inside, which is difficult to discriminate only by visually recognizing the appearance of the inspection target P, on the image of the appearance based on the display of the display unit 7, so that the operator can easily discriminate the position which is considered to be defective.

Further, in the first embodiment, the control unit 5 is configured to perform control of displaying the surface layer inspection image D1 and the appearance inspection image D2 side by side on the display unit 7. With this configuration, the operator can visually recognize the surface layer inspection image D1 and the appearance inspection image D2 while easily comparing them.

Also, in the first embodiment, the control unit 5 is configured to cause the interfered laser light L1 and the incoherent light L2 reflected at the measurement region Pa to be imaged by the common image sensor 46 (imaging unit).

Here, in cases where the interfered laser light L1 and the incoherent light L2 reflected at the measurement region Pa are imaged by separate image sensors 46, it is considered that adjustments are required for each of the separate image sensors 46. As in the above-described embodiment, in cases where imaging is performed by the common image sensor 46, it is only necessary to adjust one image sensor 46, so that it is possible to suppress an increase in the workload of the adjusting work by the operator. Further, an increase in the number of components can be suppressed as compared with the case in which separate image sensors 46 are provided.

Further, since the images are captured by the common image sensor 46, the surface layer inspection image D1 and the appearance inspection image D2 can be easily configured to be imaged in the same field of view. As a result, it becomes not necessary for the operator to compare the position determined to be the position of the defective part Q occurred inside with the position determined to be the position of the defective part R occurred on the outer surface, so that the workload on the operator can be reduced.

In the first embodiment, the speckle/shearing interferometer 4 (interference unit) includes common optical members arranged on the optical path of the laser light L1 and the incoherent light L2. The optical members include a bandpass filter 45 (optical filter) that transmits light having a predetermined wavelength. The interfered laser light L1 and the incoherent light L2 reflected at the measurement region Pa have a wavelength that can pass through the common bandpass filter 45 and are imaged by the common image sensor 46.

By configuring as described above, the imaging of the laser light L1 and the imaging of the incoherent light L2 can be performed using the common optical filter. As a result, even in cases where the surface layer defect inspection and the appearance inspection are performed together by a single apparatus, it is possible to suppress an increase in the number of components.

Second Embodiment

Figure 8:
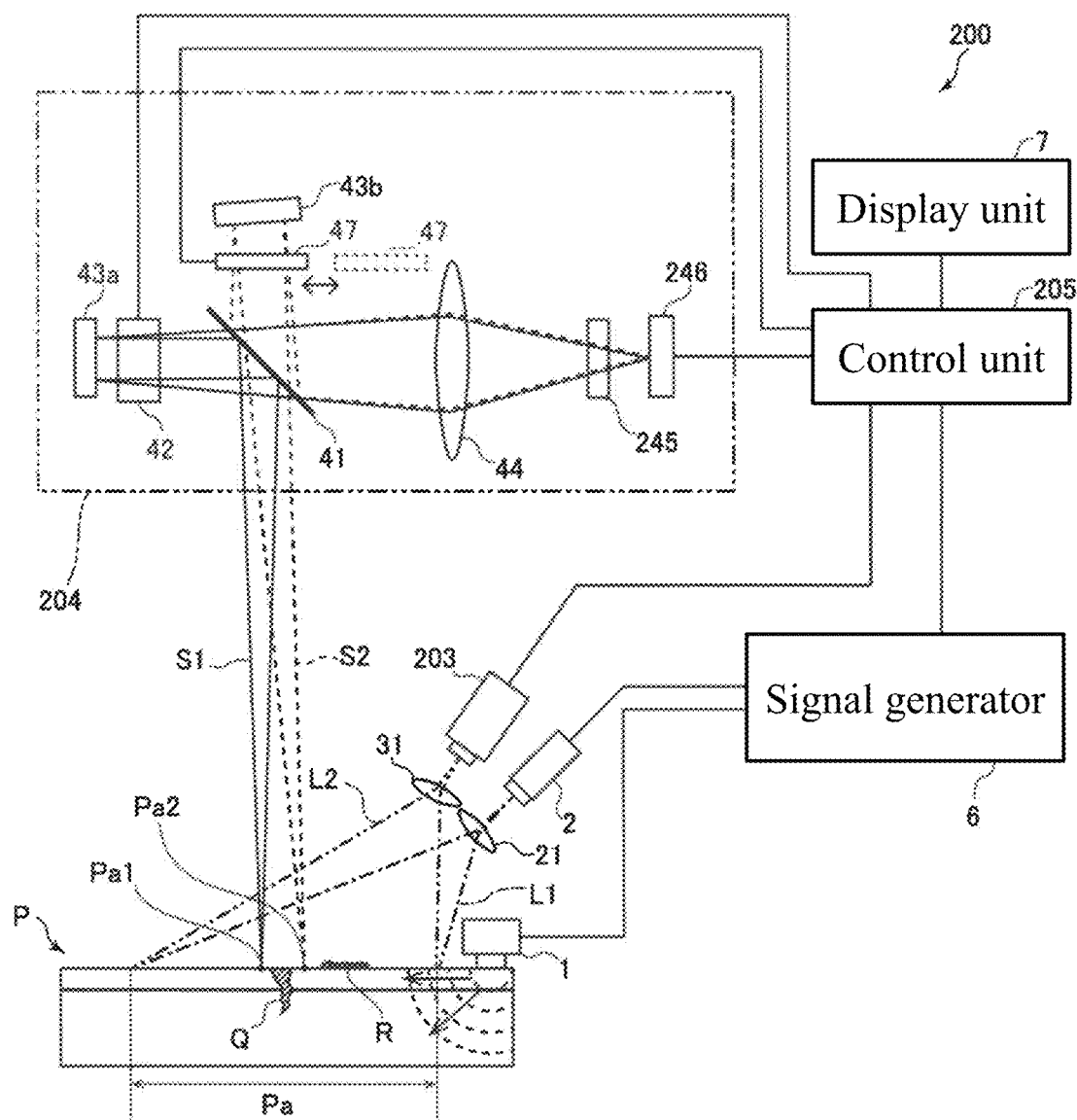
FIG. 8 is a diagram for explaining a configuration of a defect inspection apparatus according to a second embodiment.

Referring to FIG. 8, a configuration of a defect inspection apparatus 200 according to a second embodiment will be described. In this second embodiment, unlike the first embodiment in which the center wavelength of the incoherent light L2 is set to be 780 nm to 800 nm, which is close to the wavelength of the laser light L1 since the laser light L1 and the incoherent light L2 are imaged using the common optical members, the incoherent light L202 is configured to be light including wavelengths of three primary colors (red, green, and blue).

In the drawings, the same components as those of the above-described first embodiment are denoted by the same reference numerals, and the descriptions thereof will be omitted.

Configuration of Defect Inspection Apparatus of Second Embodiment

As shown in FIG. 8, the defect inspection apparatus 200 according to the second embodiment of the present invention includes a second irradiation unit 203, a speckle/shearing interferometer 204, and a control unit 205. The speckle/shearing interferometer 204 includes a bandpass filter 245 and an image sensor 246.

The second irradiation unit 203 irradiates the measurement region Pa with the incoherent light L202 defined as light which is incoherent. The incoherent light L202 is configured to include light having a wavelength of red color, light having a wavelength of green color, and light having a wavelength of blue color. Specifically, the second irradiation unit 203 is configured to emit three types of incoherent light, namely, the incoherent light L202r, the incoherent light L202g, and the incoherent light L202b.

The incoherent light L202r includes light having a wavelength of red color. The incoherent light L202g includes light having a wavelength of green color. The incoherent light L202b includes light having a wavelength of blue color. Here, the second irradiation unit 203 may be configured to include one light source for emitting each of the light including three types of wavelengths or may be configured to include three light sources for emitting respective light including three types of wavelengths.

The bandpass filter 245 is arranged between the condenser lens 44 and the image sensor 246. The bandpass filter 245 transmits light having a plurality of particular wavelengths. The bandpass filter 245 is configured to not transmit (configured to attenuate) light no having the predetermined wavelengths. The bandpass filter 245 includes, for example, a dielectric multilayer film. That is, the bandpass filter 245 is configured to transmit light having four particular wavelengths: a wavelength of light included in the laser light L1, a wavelength of red color, a wavelength of green color, and a wavelength of blue color.

The image sensor 246 is configured to detect the laser light L1 and the incoherent light L202. That is, the image sensor is configured to detect light having a wavelength of 785 nm, light having a wavelength of red color, light having a wavelength of green color, and light having a wavelength of blue color.

The control unit 205 controls irradiation by the first irradiation unit 2 and the second irradiation unit 203. That is, the control unit 205 performs control of causing the first irradiation unit 2 to emit laser light L1. The control unit 205 performs control of causing the second irradiation unit 203 to emit the incoherent light L202r, the incoherent light L202g, and the incoherent light L202b by switching.

The control unit 205 generates a surface layer inspection image D1 based on the intensity pattern of the laser light L1 detected by the image sensor 246. Further, the control unit 205 generates three types of appearance inspection monochrome images based on the respective light intensity patterns of light having a wavelength of red color included in the incoherent light L202r, light having a wavelength of green color included in the incoherent light L202g, and light having a wavelength of blue color included in the incoherent light L202b. The control unit 205 is configured to generate an appearance inspection image D202 of a color image based on the generated three types of appearance inspection monochrome images.

The rest of the configuration of the second embodiment is the same as that of the first embodiment.

Effects of Second Embodiment

In this second embodiment, the following effects can be obtained.

In the second embodiment, as described above, the incoherent light L202 is configured to include light having a wavelength of red color, light having a wavelength of green color, and light having a wavelength of blue color. By configuring as described above, the appearance inspection image D202 can be acquired as a color image. As a result, the appearance inspection can be performed using the hue information in addition to the lightness information, so that the accuracy of the appearance inspection can be further improved.

The other effects of the second embodiment are the same as those of the above-described first embodiment.

Third Embodiment

Figure 9:
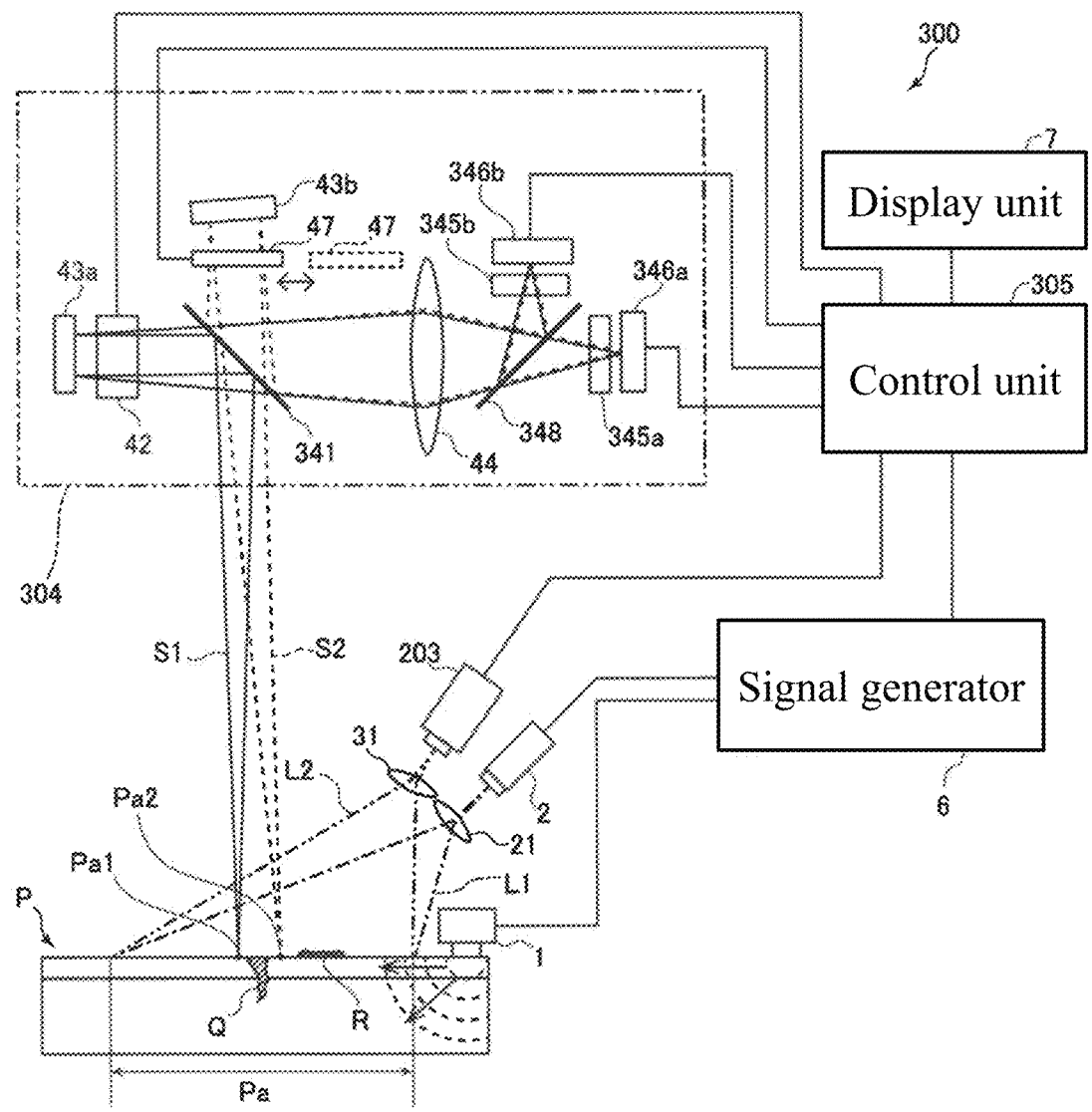
FIG. 9 is a diagram for explaining a configuration of a defect inspection apparatus according to a third embodiment.

Referring to FIG. 9, a configuration of a defect inspection apparatus 300 according to a third embodiment will be described. Unlike the first and second embodiments configured to image the laser light L1 and the incoherent light L2 and L202 by the common image sensor 46 and 246, the third embodiment is configured to include two different image sensors (imaging units) of a first image sensor 346a and a second image sensor 346b and image the laser light L1 and the incoherent light L202 by separate image sensors (the first image sensor 346a and the second image sensor 346b).

Note that in the figures, the same components as those of the first and second embodiments are denoted by the same reference numerals, and the descriptions thereof will be omitted.

Configuration of Defect Inspection Apparatus of Third Embodiment

As shown in FIG. 9, the defect inspection apparatus 300 according to the third embodiment of the present invention includes a speckle/shearing interferometer 304 and a control unit 305. The speckle/shearing interferometer 304 includes a first bandpass filter 345a, a second bandpass filter 345b, the first image sensor 346a, the second image sensor 346b, a first beam splitter 341, and a second beam splitter 348.

The first bandpass filter 345a is arranged between the first image sensor 346a and the second beam splitter 348. Further, the first bandpass filter 345a transmits light having a predetermined wavelength. The first bandpass filter 345a is configured so as not to transmit (configured to attenuate) light not having the predetermined wavelength. The first bandpass filter 345a is configured to include, for example, a dielectric multilayer film and have a center wavelength of 785 nm. That is, the first bandpass filter 345a is configured to transmit light having a wavelength of the laser light L1.

The second bandpass filter 345b is arranged between the second image sensor 346b and the second beam splitter 348. The second bandpass filter 345b transmits light having a plurality of predetermined wavelengths. The second bandpass filter 345b is configured so as not to transmit (configured to attenuate) light not having the predetermined wavelengths. The second bandpass filter 345b includes, for example, a dielectric multilayer film. That is, it is configured to transmit light having three predetermined wavelengths of light having a wavelength of red color, light having a wavelength of green color, and light having a wavelength of blue color.

The first image sensor 346a is configured to detect the laser light L1. That is, the first image sensor is configured to detect light having a wavelength of 785 nm.

The second image sensor 346b is configured to detect the incoherent light L202. That is, the second image sensor is configured to detect light having a wavelength of red color, light having a wavelength of green color, and light having a wavelength of blue color.

The first beam splitter 341 is configured in the same manner as the beam splitter 41 in the first and second embodiments.

The second beam splitter 348 includes a half mirror. The second beam splitter 348 is arranged at a position where the laser light L1 and the incoherent light L202 that have passed through the condenser lens 44 enter. Further, the second beam splitter 348 transmits the incident laser light L1 and the incoherent light L202 toward the first image sensor 346a, and reflects them toward the second image sensor 346b.

The control unit 305 generates the surface layer inspection image D1 based on the intensity pattern of the laser light L1 detected by the first image sensor 346a. Further, the control unit 305 generates three types of appearance inspection monochrome images based on the intensity pattern of each of the light having a wavelength of red color, the light having a wavelength of green color, and the light having a wavelength of blue color included in the incoherent light L202 detected by the second image sensor 346b. The control unit 305 is configured to generate the appearance inspection images D302 of color images based on the generated three types of appearance inspection monochrome images.

The rest of the configuration of the third embodiment is the same as that of the first and second embodiments.

Effects of Third Embodiment

In this third embodiment, the following effects can be obtained.

In the third embodiment, as described above, the imaging unit is configured to include the first image sensor 346a (first imaging unit) configured to image the laser light L1 and the second image sensor 346b (second imaging unit) provided separately from the first image sensor 346a to image the incoherent light L2.

By configuring as described above, the configuration of the first image sensor 346a can be configured to be suitable for capturing the image of the laser light L1, and the configuration of the second image sensor 346b can be configured to be suitable for capturing the image of the incoherent light L202. That is, the first image sensor 346a can be configured to image the light having a wavelength suitable for laser interferometry, and the second image sensor 346b can be configured to image the light having a wavelength suitable for an appearance inspection. As a result, it becomes possible to perform the surface layer defect inspection with high accuracy based on the surface layer inspection image D1, and it also becomes possible to perform the appearance inspection with higher accuracy based on the appearance inspection image D302.

The other effects of the third embodiment are the same as those of the first and second embodiments.

Fourth Embodiment

Figure 10:
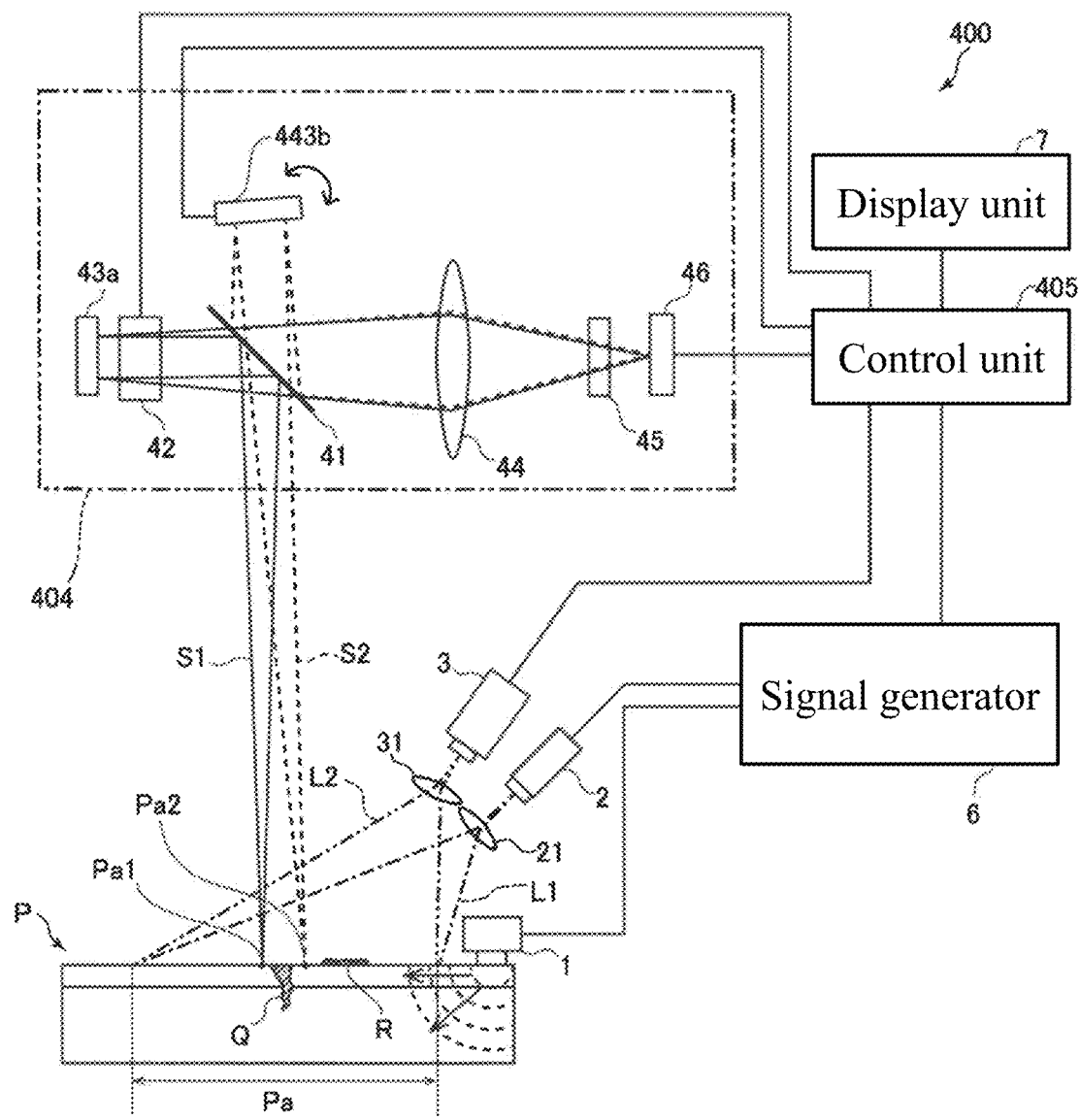
FIG. 10 is a diagram for explaining a configuration of a defect inspection apparatus according to a fourth embodiment.
Figure 11:
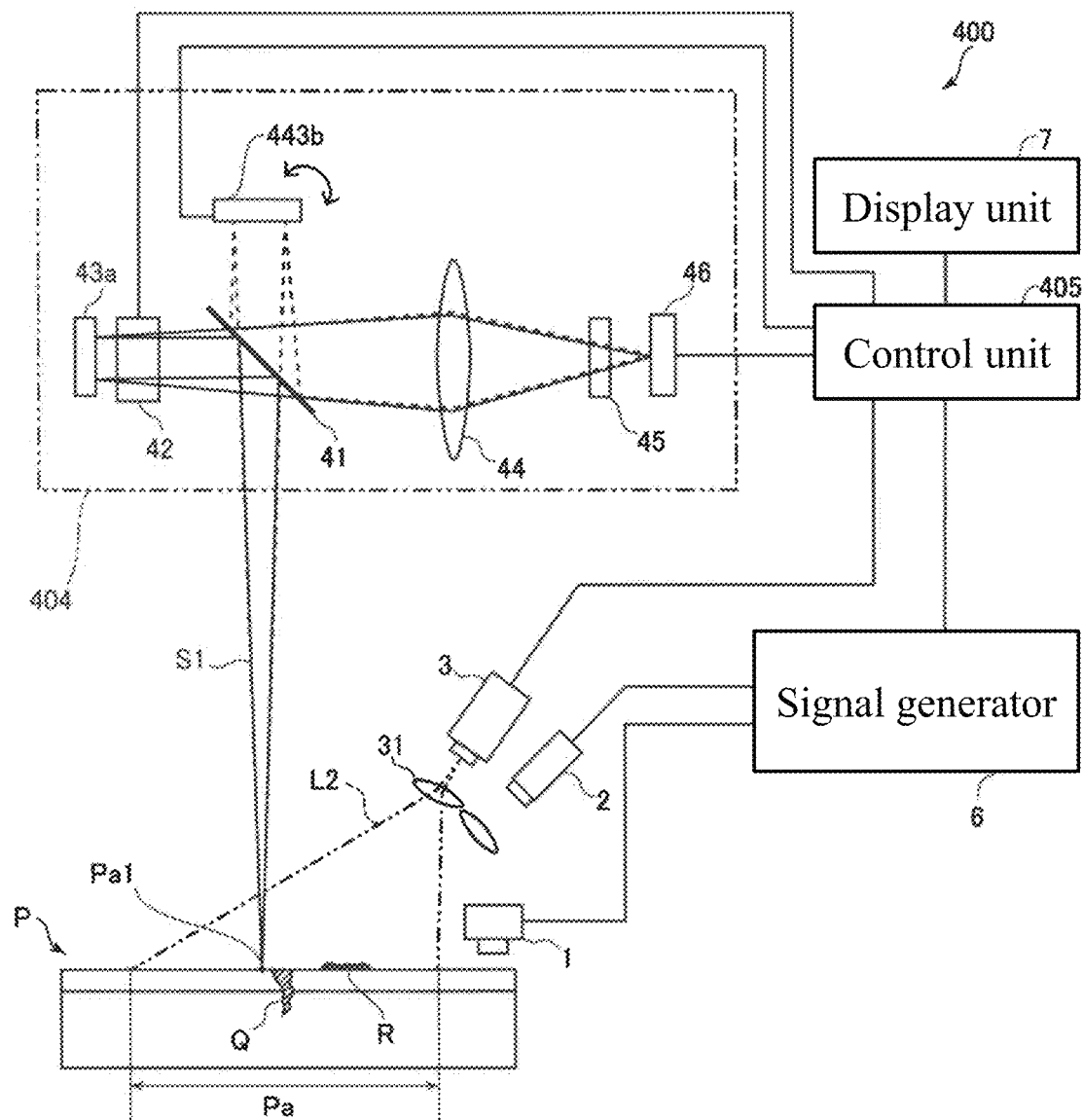
FIG. 11 is a diagram for explaining an operation of a second reflecting mirror according to a fourth embodiment.

Referring to FIG. 10 and FIG. 11, a configuration of a defect inspection apparatus 400 according to a fourth embodiment will be described. In this fourth embodiment, unlike the first embodiment configured such that in a state in which either one optical path of mutually different two optical paths is blocked by the shutter 47, the image sensor 46 (imaging unit) is caused to image the incoherent light L2 using the other optical path by causing the second irradiation unit 3 to emit the incoherent light L2, in a state in which the second reflecting mirror 443b is arranged at an angle of 45 degrees with respect to the reflective surface of the beam splitter 41 by adjusting the angle of the second reflecting mirror 443b without using the shutter 47, it is configured to image the incoherent light L2.

In the figures, the same components as those of the above-described first embodiment are denoted by the same reference numerals, and the descriptions thereof will be omitted.

Configuration of Defect Inspection Apparatus of Fourth Embodiment

As shown in FIG. 10, the defect inspection apparatus 400 according to the fourth embodiment of the present invention is provided with a speckle/shearing interferometer 404 and a control unit 405. The speckle/shearing interferometer 404 includes a second reflecting mirror 443b arranged on the optical path through which the laser light L1 passes.

The second reflecting mirror 443b is arranged on the optical path of the laser light L1 and the incoherent light L2 transmitting the beam splitter 41 at an angle slightly inclined from an angle of 45 degrees with respect to the reflective surface of the beam splitter 41. The second reflecting mirror 443b is configured to reflect the incident laser light L1 transmitted through the beam splitter 41 to the beam splitter 41. The second reflecting mirror 443b is configured to change the position (angular) thereof with respect to the beam splitter 41. The second reflecting mirror 443b is configured to change its position (angle) to an angle of 45 degrees with respect to the reflective surface of the beam splitter 41.

The control unit 405 is configured to change the position (angular) of the second reflecting mirror 443b. That is, the control unit 405 is configured to cause the image sensor 46 to image the incoherent light L2 by irradiating the incoherent light L2 in a state in which either one optical path of mutually different two optical paths through which the laser light L1 reflected at mutually different two points passes is changed by changing the position (angle) of the second reflecting mirror 443b.

The control unit 405 causes the first irradiation unit 2 to emit the laser light L1 in a state in which the second reflecting mirror 443b is arranged at an angle slightly inclined from a degree of 45 degrees with respect to the reflective surface of the beam splitter 41. The control unit 405 generates a surface layer inspection image D1 based on the intensity pattern of the interfered laser light L1 captured by the image sensor 46. That is, the control unit 405 performs control of causing the image sensor 46 to capture an image by causing the interference of the laser light L1 reflected at mutually different two points on the surface of the measurement region Pa (for example, the position Pa1 and the position Pa2 in FIG. 10), and generates the surface layer inspection image D.

Further, as shown in FIG. 11, the control unit 405 causes the second irradiation unit 3 to emit the incoherent light L2 in a state in which the second reflecting mirror 443b is arranged at an angle of 45 degrees with respect to the reflective surface of the beam splitter 41 by changing the position (angle) of the second reflecting mirror 443b. The control unit 405 then generates an appearance inspection image D2 based on the intensity pattern of the incoherent light L2 captured by the image sensor 46. That is, the control unit 405 performs control of causing the image sensor 46 to capture the image of the incoherent light L2 reflected at one point (e.g., the position Pa1) of the measurement region Pa, and generates an appearance inspection image D2.

The rest of the configuration of the fourth embodiment is the same as that of the first embodiment.

Effects of Fourth Embodiment

In this fourth embodiment, the following effects can be obtained.

In the fourth embodiment, as described above, the apparatus is further provided with the second reflecting mirror 443b (reflecting mirror member) arranged on the optical path through which the laser light L1 passes. The control unit 405 is configured to cause the image sensor 46 (imaging unit) to image the incoherent light L2 by emitting the incoherent light L2 in a state in which either one optical path of mutually different two optical paths through which the laser light L1 reflected at mutually different two points (Pa1 and Pa2) passes by changing the position (angle) of the second reflecting mirror 443b.

Here, it is assumed to cause the second irradiation unit 3 to emit the incoherent light L2 by using both of optical paths through which the laser light L1 reflected at mutually different two points passes. In such cases, since the incoherent light L2 reflected at mutually different two points forms an image and the image is captured by the image sensor 46, it is considered that the captured appearance inspection image D2 becomes doubly blurred, resulting in a degraded image.

Considering this point, as in the above-described fourth embodiment, the position (angle) of the second reflecting mirror 443b is changed to have one optical path. As a result, since the incoherent light L2 reflected at one point of the measurement region Pa is caused to form an image, the appearance inspection image D2 does not become a blurred image, so that a clear image can be obtained. Further, the increase in the number of components can be suppressed as compared with the case in which the optical path is closed by using a shutter or the like. As a result, even in cases where laser interference is performed by using a method (Shearography method) in which the laser light L1 reflected at mutually different two points of the measurement region Pa, it is possible to more easily suppress degradation of the image quality of the appearance inspection image D2.

The other effects of the fourth embodiment are the same as those of the above-described first embodiment.

Fifth Embodiment

Figure 12:
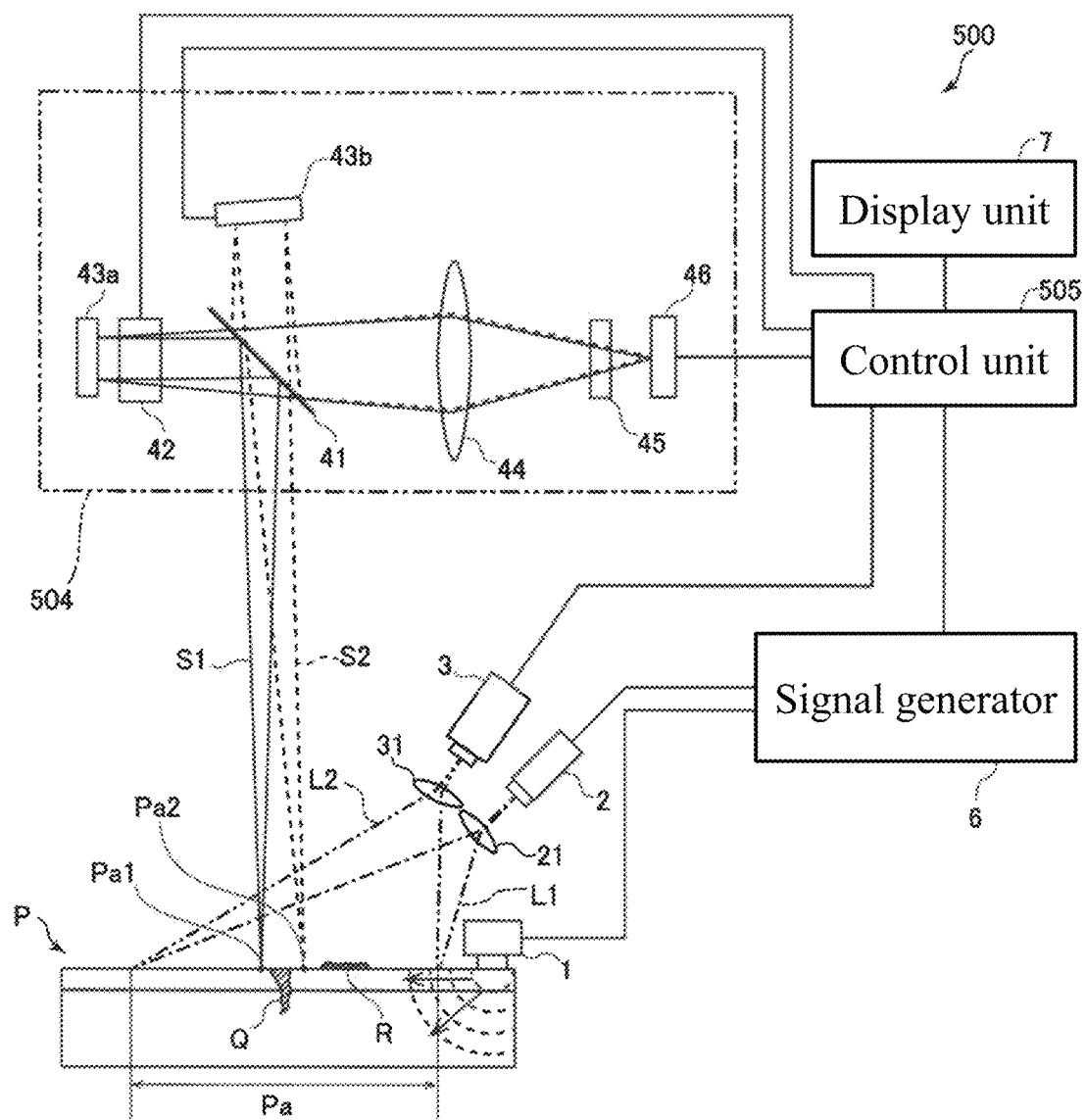
FIG. 12 is a diagram for explaining a configuration of a defect inspection apparatus according to a fifth embodiment.

Referring to FIG. 12, FIG. 13A, and FIG. 13B, a configuration of a defect inspection apparatus 500 according to a fifth embodiment will be described. In this fifth embodiment, unlike the first embodiment configured such that in a state in which either one optical path of the mutually different two optical paths is blocked by the shutter 47, the image sensor 46 (imaging unit) is caused to image the incoherent light L2 by causing the second irradiation unit 3 to emit the incoherent light L2 using the other optical path, it is configured to image the incoherent light L2 reflected at mutually different two points of the measurement region Pa and perform image processing on the appearance inspection image D502a generated based on the intensity pattern of the imaged incoherent light L2.

In the figures, the same components as those of the above-described first embodiment are denoted by the same reference numerals, and the descriptions thereof will be omitted.

Configuring Defect Inspection Apparatus of Fifth Embodiment

As shown in FIG. 12, the defect inspection apparatus 500 according to the fifth embodiment of the present invention is provided with a speckle/shearing interferometer 504 and a control unit 505.

The speckle/shearing interferometer 504 causes interference of the laser light L1 reflected at mutually different two points of the measurement region Pa (e.g., the position Pa1 and the position Pa2) by laser interferometry. The speckle/shearing interferometer 504 forms an image of the interfered laser light L1 on the image sensor 46. Further, the speckle/shearing interferometer 504 causes the image sensor 46 to form an image of the incoherent light L2 reflected at mutually different two points of the measurement region Pa (e.g., the position Pa1 and the position Pa2).

The control unit 505 controls the irradiation by the first irradiation unit 2 and the second irradiation unit 3. The control unit 505 is configured to generate a surface layer inspection image D1 based on the intensity pattern of the interfered laser light L1 imaged by the image sensor 46.

Further, the control unit 505 is configured to generate an appearance inspection image D502a based on the intensity pattern of the incoherent light L2 reflected at mutually different two points in the measurement region Pa. Here, since the appearance inspection image D502a is generated based on the intensity pattern of the incoherent light L2 reflected at mutually different two points in the measurement region Pa, the image becomes blurred. Specifically, since the incoherent light L2 reflected at two positions apart from each other by a small distance in the measurement region Pa is imaged on one of the elements of the image sensor 46, the generated appearance inspection image D502a becomes a doubly captured blurred image as shown in FIG. 13A.

Note that the term "blurred/blurring" herein means an ambiguity of an image that occurred in the appearance inspection image D502a because the incoherent light L2 reflected at two points is imaged. In other words, the term "blurred/blurring" herein means unclearness and obscuring of an image, such as, e.g., blurring, defocusing, and double-capturing of an image.

The control unit 505 is configured to generate a blurring-resolved appearance inspection image D502b by performing blurring reduction image processing on the generated blurred appearance inspection image D502a (see FIG. 13B).

The image processing, for example, performs deconvolution processing. The deconvolution processing is processing for removing blurring and/or defocusing in an image. More specifically, a point spread function (PSF: Point spread function) of the optical system is acquired in advance, and deconvolution processing is performed on the generated blurred appearance inspection image D502a, thereby removing the PSF from the blurred appearance inspection image D502a to solve the blurring (double capturing).

The rest of the configuration of the fifth embodiment is the same as that of the first embodiment.

Effects of Fifth Embodiment

In the fifth embodiment, the following effects can be obtained.

In the fifth embodiment, as described above, the control unit 505 is configured to perform image processing for reducing blurring in the blurred appearance inspection image D502a generated based on the intensity pattern of the incoherent light L2 reflected at mutually different two points. With this, it is possible to acquire an appearance inspection image D502b in which image processing for reducing blurring is performed by the control unit 505. Further, since it is not necessary to newly provide a component for changing an optical path in order to suppress blurring in the appearance inspection image D502b, it is possible to suppress an increase in the number of components.

The other effects of the fifth embodiment are the same as those of the above-described first embodiment.

Sixth Embodiment

Figure 14:
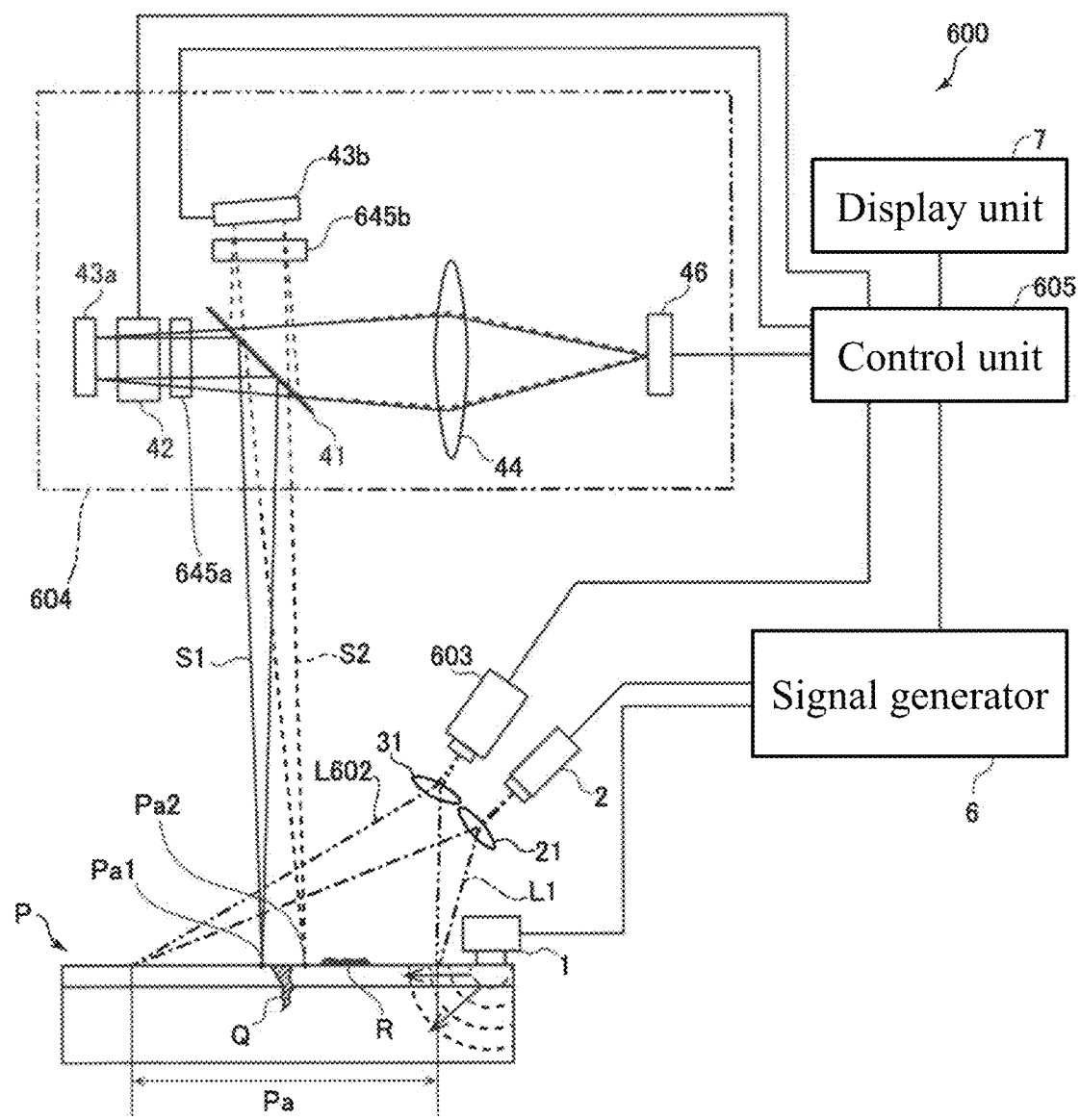
FIG. 14 is a diagram for explaining a configuration of a defect inspection apparatus according to a sixth embodiment.

Referring to FIG. 14, a configuration of a defect inspection apparatus 600 according to a sixth embodiment will be described. In this sixth embodiment, unlike the first embodiment configured such that in a state in which either one optical path of the mutually different two optical paths is blocked by the shutter 47, the image sensor 46 (imaging unit) is caused to image the incoherent light L2 by causing the second irradiation unit 3 to emit the incoherent light L2 using the other optical path, it is configured to provide bandpass filters (the first bandpass filter 645a and the second bandpass filter 645b) that allows a particular wavelength to pass through at each of the mutually different two optical paths.

In the figures, the same components as those of the above-described first embodiment are denoted by the same reference numerals, and the descriptions thereof will be omitted.

Configuration of Defect Inspection Apparatus of Sixth Embodiment

As shown in FIG. 14, the defect inspection apparatus 600 according to the sixth embodiment of the present invention is provided with a second irradiation unit 603, a speckle/shearing interferometer 604, and a control unit 605.

The second irradiation unit 603 irradiates the measurement region Pa with the incoherent light L602 defined as light which is incoherent. The incoherent light L602 is configured to have a wavelength different from the wavelength of the laser light L1 irradiated by the first irradiation unit 2.

The speckle/shearing interferometer 604 is configured to include the first bandpass filter 645a for transmitting light having a predetermined wavelength on one of mutually different two optical paths through which the laser light L1 and the incoherent light L602 reflected at mutually different two points (e.g., the position Pa1 and the position Pa2) in the measurement region Pa commonly pass, and the second bandpass filter 645b for transmitting light having a predetermined wavelength on the other of the mutually different two optical paths.

The first bandpass filter 645a is an example of the "first optical filter" recited in claims. The second bandpass filter 645b is an example of the "second optical filter" recited in claims.

The first bandpass filter 645a is arranged between the beam splitter 41 and the phase shifter 42. The first bandpass filter 645a transmits light having a predetermined wavelength. The first bandpass filter 645a is configured so as not to transmit (configured to attenuate) light not having the predetermined wavelength. The first bandpass filter 645a includes, for example, a dielectric multilayer film. The first bandpass filter 645a is configured to transmit light having a wavelength of the laser light L1. Further, the first bandpass filter 645a is configured so as not to transmit (configured to attenuate) the light having the wavelength of the incoherent light L602.

The second bandpass filter 645b is arranged between the beam splitter 41 and the second reflecting mirror 43b. The second bandpass filter 645b transmits light having a predetermined wavelength. The second bandpass filter 645b is configured so as not to transmit (configured to attenuate) light not having the predetermined wavelength. The second bandpass filter 645b includes, for example, a dielectric multilayer film. The second bandpass filter 645b is configured to transmit both the light having the wavelength of the laser light L1 and the light having the wavelength of the incoherent light L602.

The control unit 605 controls the irradiation of the incoherent light L602 by the second irradiation unit 603. The control unit 605 generates an appearance inspection image D2 based on the intensity pattern of the incoherent light L602 imaged by the image sensor 46. Further, the control unit 605 is configured to differentiate the timing of causing the image sensor 46 to image the laser light L1 by causing the first irradiation unit 2 to emit the laser light L1 and the timing of causing the image sensor 46 to image the incoherent light L602 by causing the second irradiation unit 6033 to emit the incoherent light L602. Further, the control unit 605 is configured to cause the image sensor 46 to image the incoherent light L602 by causing the second irradiation unit 603 to emit the incoherent light L602 in a state in which the operation of the vibrator 1 is stopped.

The rest of the configuration of the sixth embodiment is the same as that of the first embodiment.

Effects of Sixth Embodiment

In the sixth embodiment, the following effects can be obtained.

In the sixth embodiment, as described above, the speckle/shearing interferometer 604 is configured to include the first bandpass filter 645a (the first optical filter) for transmitting light having a predetermined wavelength on one of mutually different two optical paths through which the laser light L1 and the incoherent light L602 reflected at mutually different two points commonly pass, and the second bandpass filter 645b (the second optical filter) for transmitting light having a predetermined wavelength on the other of the mutually different two optical paths. The first bandpass filter 645a is configured to transmit the laser light L1 and attenuate the incoherent light L602, and the second bandpass filter 645b is configured to transmit the laser light L1 and the incoherent light L602.

With this, since the incoherent light L602 reflected at one point in the measurement region Pa is imaged, the appearance inspection image D2 does not become a blurred image, so that a clear image of the appearance inspection image D2 can be obtained. Further, by arranging the first bandpass filter 645a and the second bandpass filter 645b on an optical path, it becomes unnecessary to control the operation of the components constituting the speckle/shearing interferometer 604 in order to change and/or block the optical path. As a result, even in cases where the laser interference is performed by using a method (Shearography method) of causing interference of the laser light L1 reflected at mutually different two points in the measurement region Pa, it is possible to suppress the increase of the processing load for further suppressing the degradation of the image quality of the appearance inspection image D2.

The other effects of the sixth embodiment are the same as those of the above-described first embodiment.

Seventh Embodiment

Figure 15:
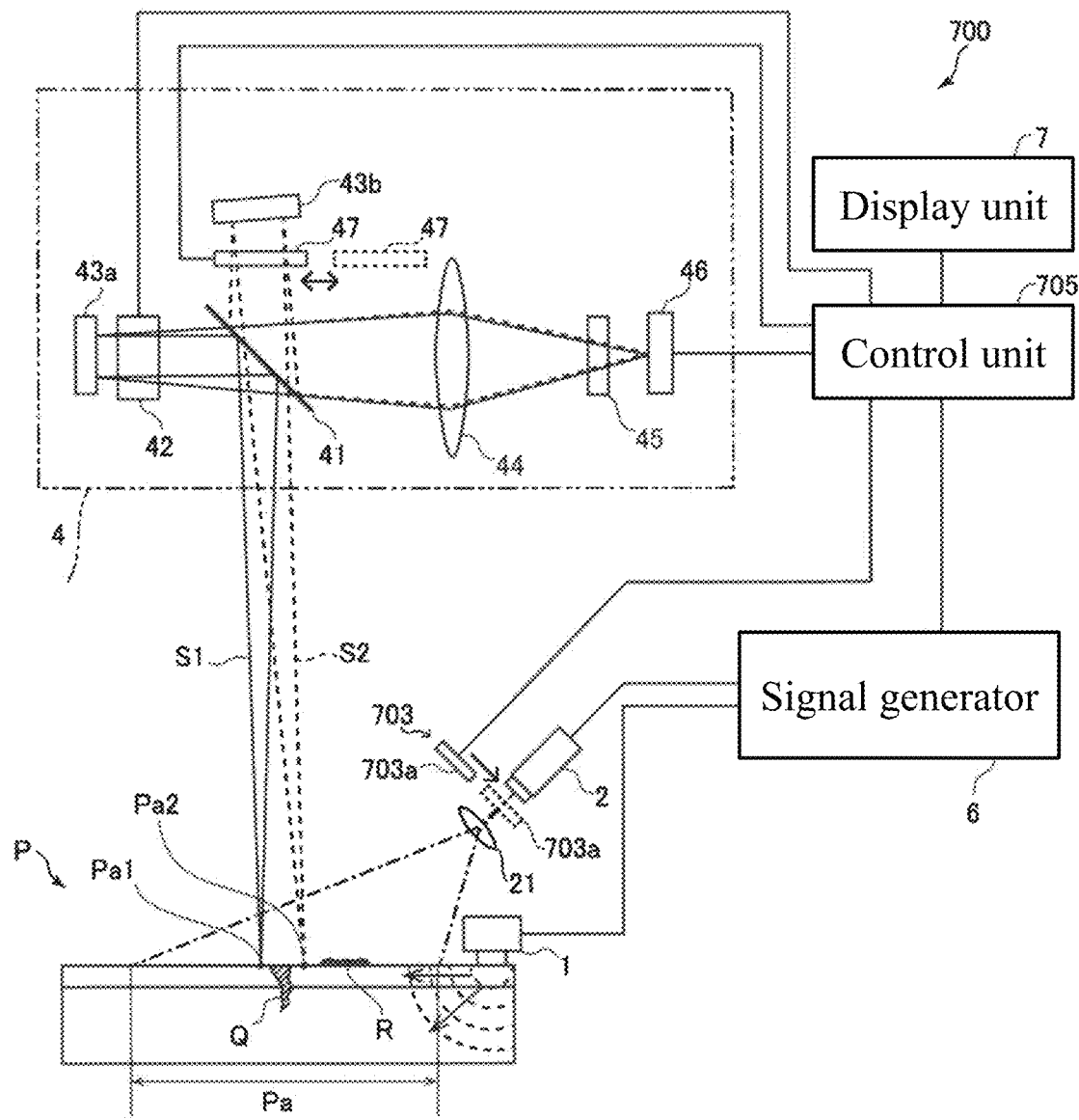
FIG. 15 is a diagram for explaining a configuration of a defect inspection apparatus according to a seventh embodiment.

Referring to FIG. 15, a configuration of a defect inspection apparatus 700 according to a seventh embodiment will be described. In the seventh embodiment, unlike the first embodiment configured to include the first irradiation unit 2 for emitting the laser light L1 and the second irradiation unit 3 for emitting the incoherent light L2, the apparatus is configured to provide a first irradiation unit 2 for emitting laser light L1 and a second irradiation unit 703 for irradiating incoherent light L702 by reducing the coherence of the emitted laser light L1.

In the figures, the same components as those of the above-described first embodiment are denoted by the same reference numerals, and the descriptions thereof will be omitted.

Configuration of Defect Inspection Apparatus of Seventh Embodiment

As shown in FIG. 15, the defect inspection apparatus 700 according to a seventh embodiment of the present invention is provided with a second irradiation unit 703 and a control unit 705.

The second irradiation unit 703 is configured to irradiate the measurement region Pa with the incoherent light L702 defined as light which is incoherent by reducing the coherence of the laser light L1 emitted from the first irradiation unit 2. The second irradiation unit 703 includes, for example, a speckle reducer 703a. The speckle reducer 703a reduces the coherence of the laser light L1 by diffusing the laser light L1.

The control unit 705 controls the irradiation by the first irradiation unit 2 and the second irradiation unit 703. That is, the control unit 705 performs control of the irradiation of the laser light L1 by the first irradiation unit 2 and also performs control of the operation of the second irradiation unit 703 to emit the incoherent light L702 with the coherence of the laser light L1 emitted from the first irradiation unit 2 lowered.

Further, the control unit 705 is configured to differentiate the timing of causing the image sensor 46 to image the laser light L1 by causing the first irradiation unit 2 to emit the laser light L1 and the timing of causing the image sensor 46 to image the incoherent light L702 by causing the second irradiation unit 703 to emit the incoherent light L702. Further, the control unit 705 is configured to generate a surface layer inspection image D1 based on the intensity pattern of the interfered laser light L1 imaged by the image sensor 46 and generate an appearance inspection image D2 based on the intensity pattern of the incoherent light L702 imaged by the image sensor 46.

The rest of the configuration of the seventh embodiment is the same as that of the first embodiment.

Effects of Seventh Embodiment

In this seventh embodiment, the following effects can be obtained.

In the seventh embodiment, as described above, the second irradiation unit 703 is configured to emit the incoherent light L702 by reducing the coherence of the laser light L1 emitted by the first irradiation unit 2.

Thus, it is possible to emit the laser light L1 and the incoherent light L702 by a single light source, which in turn can suppress an increase in the number of components as compared with the case in which two light sources (irradiation units) are provided. Further, since the laser light L1 is emitted as the incoherent light L702 by diffusing the laser light L1, the wavelength of the laser light L1 and the wavelength of the incoherent light L702 become substantially equal. As a result, a member, such as, e.g., a bandpass filter, can be made the same, so that an increase in the number of components can be suppressed.

The other effects of the seventh embodiment are the same as those of the above-described first embodiment.

Modified Embodiment

It should be understood that the embodiments disclosed herein are examples in all respects and are not restrictive. The scope of the present invention is indicated by claims rather than by the above-described embodiments and includes all modifications within the meanings and ranges equivalent to the claims.

For example, in the above-described first to seventh embodiments, an example is shown in which a vibrator for exciting an elastic wave in a measurement region by mechanical vibrations by coming into contact with an inspection target as a displacement unit for displacing the measurement region of the inspection target is used, but the present invention is not limited thereto. For example, the elastic wave may be excited by a strong speaker arranged at a position not touching the inspection target. Alternatively, the measurement region may be displaced by applying heat to the inspection target using a pulsed high-frequency source as a displacement unit. Further, a pulsed laser may be configured as the displacement unit.

In the above-described first to seventh embodiments, an example is shown in which a speckle/shearing interferometer is used by using a Shearography method as laser interferometry, but the present invention is not limited thereto. In the present invention, the interference unit may be configured by other optical interferometers.

Further, in the above-described first to seventh embodiments, an example is shown in which an image, such as, e.g., a surface layer inspection image and an appearance inspection image, are generated by the control unit, but the present invention is not limited thereto. For example, an image may be generated using an external image processing unit, such as, e.g., a GPU (Graphics Processing Unit).

Further, in the above-described first to seventh embodiments, an example is shown in which when performing image processing of generating an appearance inspection image, the position of a defective part occurred on the outer surface is determined based on the difference value of the luminance values of pixels, but the present invention is not limited thereto. It may be configured such that the average value of luminance values for a plurality of images is acquired and then a region having a value apart from the average value by an amount exceeding a predetermined threshold value is determined as the position of the defective part occurred on the outer surface. Further, the determination may be performed by machine learning using a technique called an auto encoder.

Further, in the above-described first to third and seventh embodiments, an example is shown in which the shutter is configured to block the optical path (see, the broken line S2 in FIG. 1) between the beam splitter and the second reflecting mirror, but the present invention is not limited thereto. For example, the optical path between the beam splitter and the first reflecting mirror (see, the solid line S1 in FIG. 1) may be blocked.

Further, in the above-described first to seventh embodiments, an example is shown in which the emission of the laser light by the first irradiation unit and the emission of the incoherent light by the second irradiation unit are performed after the imaging (detection) of the laser light by the imaging unit are described, but the present invention is not limited thereto. For example, it may be configured to emit the incoherent light before emitting the laser light. Further, it may be configured to emit the incoherent light in the middle of emitting the laser light a plurality of times.

Further, in the above-described first to seventh embodiments, an example using a CMOS image sensor and a CCD image sensor is shown as an example of the image sensor (imaging unit), but the present invention is not limited thereto. For example, a line sensor or a streak camera may be used.

In the above-described first to seventh embodiment, an example is shown in which the speckle/shearing interferometer (interference unit) includes common optical members arranged on the optical path of the laser light and the incoherent light, but the present invention is not limited thereto. For example, the imaging may be performed using separate optical members when laser light is imaged and when incoherent light is imaged.

In the above-described first to fifth and seventh embodiments, an example is shown in which the second irradiation unit is configured to emit incoherent light including light having a wavelength equal to the wavelength of the laser light emitted by the first irradiation unit, but the present invention is not limited thereto. For example, the second irradiation unit may be configured to emit incoherent light not including light having a wavelength of the laser light emitted by the first irradiation unit.

In the above-described first to seventh embodiments, the laser interferometry is a method of causing interference of the laser light reflected at mutually different two points in the measurement region and a part of the optical path of the laser light and a part of the optical path of the incoherent light are configured to be the same, but the present invention is not limited thereto. For example, it may be configured to measure the displacement of the surface of the measurement region by causing interference of the light reflected at a single point of the measurement region.

Further, in the above-described first to third and seventh embodiments, an example is shown in which the apparatus is further provided with a shutter for blocking either one optical path of mutually different two optical paths through which the laser light reflected at mutually different two points passes and the control unit is configured, in a state in which either one optical path of two optical paths is blocked by the shutter, to cause the second irradiation unit to emit the incoherent light using the other optical path, thereby causing the imaging unit (the image sensor) to image the incoherent light, but the present invention is not limited thereto. For example, when imaging the incoherent light, it may be configured such that the blocking unit (shutter) is not provided and either one optical path of the two optical paths through which the laser light reflected at mutually different two points in the measurement region passes is not imaged on the imaging unit (image sensor). That is, a configuration may be adopted in which the blocking unit is not provided and either one of the mutually different two optical paths is not imaged on the imaging unit by changing the position of an optical member (e.g., reflector) included in the speckle/shearing interferometer.

Further, in the above-described fourth embodiment, an example is shown in which the apparatus is further provided with the reflecting mirror member arranged on the optical path through which the laser light passes and the control unit is configured, in a state in which either one optical path of mutually different optical paths through which the laser light reflected at mutually different two points passes is changed by changing the position of the reflecting mirror member, to cause the imaging unit to image the incoherent light by emitting the incoherent light, but the present invention is not limited thereto. For example, it may be configured to cause the imaging unit to image the incoherent light in a state in which mutually different two optical paths are changed by changing both positions of the first reflecting mirror and the second reflecting mirror.

Further, in the above-described fifth embodiment, an example is shown in which the imaging unit is configured to image the incoherent light reflected at mutually different two points and the control unit is configured to perform image processing of reducing blurring with respect to the blurred appearance inspection image generated based on the intensity pattern of the incoherent light reflected at the mutually different two points, but the present invention is not limited thereto. For example, it may be configured such that image processing of reducing blurring is not performed and the position determined to be defective by the appearance inspection is extracted and displayed.

Further, in the above-described sixth embodiment, an example is shown in which the speckle/shearing interferometer (interference unit) is configured to include the first bandpass filter (first optical filter) for transmitting light having a predetermined wavelength on one of mutually different two optical paths through which the laser light and the incoherent light reflected at mutually different two points commonly pass and the second bandpass filter (second optical filter) for transmitting light having a predetermined wavelength on the other of the mutually different two optical paths, the first bandpass filter is configured to transmit the laser light and attenuate the incoherent light, and the second bandpass filter is configured to transmit the laser light and the incoherent light, but the present invention is not limited thereto. For example, it may be configured such that the speckle/shearing interferometer includes a first bandpass filter on one of mutually different two optical paths but does not include a second bandpass filter on the other of the mutually different two optical paths.

Further, in the above-described fourth to sixth embodiments, an example is shown in which the second irradiation unit 3 emits the incoherent light L2, but the present invention is not limited thereto. For example, it may be configured such that a second irradiation unit 203 is used instead of the second irradiation unit 3 to emit the incoherent light L202 including light having a wavelength of three primary colors (red, green, and blue).

Further, in the above-described first to seventh embodiments, an example is shown in which the control unit is configured to differentiate the timing of causing the image sensor (imaging unit) to image the laser light by casing the first irradiation unit to emit the laser light and the timing of causing the image sensor to image the incoherent light by causing the second irradiation unit to emit the inherent light, but the present invention is not limited thereto. For example, imaging the laser light and imaging the incoherent light may be performed at the same timing.

Further, in the above-described first to seventh embodiments, an example is shown in which the control unit is configured, in a state in which the operation of vibrator (displacement unit) is stopped, to cause the image sensor (imaging unit) to image the incoherent light by causing the second irradiation unit to emit the incoherent light, the present invention is not limited thereto. For example, it may be configured such that the incoherent light is irradiated in a state in which the operation of the vibrator is not stopped.

Further, in the above-described first to seventh embodiments, an example is shown in which the apparatus is further provided with a display unit for displaying an image, and the control unit is configured to perform control of causing the display unit to display the surface layer inspection image configured to be able to visually recognize a position determined to be a position of a defective part occurred inside the measurement region, and perform control of causing the display unit to display the appearance inspection image configured to be able to visually recognize a position determined to be a position of a defective part occurred on the outer surface of the measurement region, but the present invention is not limited thereto. For example, it may be configured such that a display unit for displaying an image is not provided and the generated image is output to the outside as data.

Further, in the above-described first to seventh embodiments, an example is shown in which the control unit is configured to perform control of causing the display unit to display an extracted image, which is an image representing a position determined to be a position of a defective part occurred inside the measurement region by superimposing the extracted image on the appearance inspection image, but the present invention is not limited thereto. For example, it may be configured such that the extracted image is displayed together with the appearance inspection image side by side.

Further, in the above-described first to seventh embodiments, an example is shown in which the control unit is configured to perform control of displaying the surface layer inspection image and the appearance inspection image side by side on the display unit, but the present invention is not limited thereto. For example, it may be configured such that the surface layer inspection image is displayed on the appearance inspection image in a state of being transmitted translucently.

Further, in the above-described first to third embodiments, an example is shown in which the speckle/shearing interferometer 4 (interference unit) includes common optical members arranged on the optical path of the laser light L1 and the incoherent light L2, the optical member includes a bandpass filter 45 (optical filter) for transmitting light having a predetermined wavelength, and the interfered laser light L1 and the incoherent light L2 reflected by the measurement region Pa have a wavelength capable of passing through a common bandpass filter 45 and are imaged by a common image sensor 46, but the present invention is not limited thereto. For example, it may be configured such that the speckle/shearing interferometer is provided with a plurality of bandpass filters and the bandpass filters on the optical path are switched according to the wavelength of each of the laser light L1, the incoherent light L2 and L202 to allow the corresponding wavelength to transmit therethrough.

Further, in the above-described third embodiment, an example is shown in which the imaging unit is configured to include the first image sensor (first imaging unit) for imaging the laser light and the second image sensor (second imaging unit) for imaging the incoherent light. The second image sensor is provided separately from the first image sensor. The second irradiation unit is configured to emit incoherent light including light having a wavelength of red color, light having a wavelength of green color, and light having a wavelength of blue color, but the present invention is not limited thereto. For example, it may be configured such that the incoherent light including a wavelength close to the wavelength of the laser light is emitted, and the laser light and the incoherent light are imaged by separately provided two imaging units (a first image sensor and a second image sensor).

Further, in the above-described second and third embodiments, an example is shown in which the incoherent light having a wavelength of red color, the incoherent light having a wavelength of green color, and the incoherent light having a wavelength of a blue color, but the present invention is not limited thereto. For example, it may be configured such that the second irradiation unit emits white light which is incoherent light including light having a wavelength of red color, light having a wavelength of blue color, and light having a wavelength of green color. In this case, it may be configured such that the image sensor is equipped with color filters to acquire color images, or equipped with a monochromatic sensor to be used while switching bandpass filters for transmitting the respective wavelengths of red color, green color, and blue color.

Further, in the above-described first to seventh embodiments, an example is shown in which the laser light includes light (near-infrared light) having a wavelength of 785 nm, but the present invention is not limited thereto. It may be configured to include visible-light having a wavelength of, for example, 633 nm.

[Aspects]

It will be understood by those skilled in the art that the above-described exemplary embodiments are concrete examples of the following aspects.

(Item 1)

A defect inspection apparatus comprising:
a displacement unit configured to displace a measurement region of an inspection target;
a first irradiation unit configured to emit laser light to the measurement region;
a second irradiation unit configured to emit incoherent light defined as light which is incoherent to the measurement region;
a control unit configured to control irradiation by the first irradiation unit and the second irradiation unit;
an interference unit configured to cause interference of the laser light reflected at the measurement region by laser interferometry; and
an imaging unit configured to image the interfered laser light and the incoherent light reflected at the measurement region,
wherein a surface layer inspection image which is an image representing displacement of the inspection target in the measurement region is generated based on an intensity pattern of the interfered laser light imaged by the imaging unit, and an appearance inspection image which is an image of an outer surface of the measurement region is generated based on an intensity pattern of the incoherent light imaged by the imaging unit.

(Item 2)

The defect inspection apparatus as recited in the aforementioned Item 1,
wherein the interference unit includes a common optical member arranged on an optical path of the laser light and the incoherent light.

(Item 3)

The defect inspection apparatus as recited in the aforementioned Item 1 or 2,
wherein the second irradiation unit is configured to emit the incoherent light including light having a wavelength equal to a wavelength of the laser light emitted by the first irradiation unit.

(Item 4)

The defect inspection apparatus as recited in any one of the aforementioned Items 1 to 3,
wherein the laser interferometry is a method that causes interference of the laser light reflected at mutually different two points of the measurement region, and
wherein a part of an optical path of the laser light and a part of an optical path of the incoherent light are configured to be common.

(Item 5)

The defect inspection apparatus as recited in the aforementioned Item 4, further comprising:
a blocking unit configured to block either one optical path of different two optical paths through which the laser light reflected at the mutually different two points passes,
wherein the control unit is configured, in a state in which either one optical path of the two different optical paths is blocked by the blocking unit, to cause the imaging unit to image the incoherent light by causing the second irradiation unit to emit the incoherent light using the other optical path.

(Item 6)

The defect inspection apparatus as recited in the aforementioned Item 4, further comprising:
a reflecting mirror member arranged on an optical path through which the laser light passes,
wherein the control unit is configured to cause the imaging unit to image the incoherent light by emitting the incoherent light in a state in which either one optical path of mutually different two optical paths through which the laser light reflected at the mutually different two points passes is changed by changing a position of the reflecting mirror member.

(Item 7)
The defect inspection apparatus as recited in the aforementioned Item 4,
wherein the imaging unit is configured to image the incoherent light reflected at the mutually different two points, and
wherein the control unit is configured to perform image processing of reducing blurring on a blurred appearance inspection image generated based on an intensity pattern of the incoherent light reflected at the mutually different two points.

(Item 8)
The defect inspection apparatus as recited in the aforementioned Item 4,
wherein the interference unit is configured to include a first optical filter that transmits light having a predetermined wavelength on one of the mutually different two optical paths through which the laser light and the incoherent light reflected at the mutually different two points commonly pass and a second optical filter that transmits light having a predetermined wavelength on the other of the mutually different two optical paths,
wherein the first optical filter is configured to transmit the laser light and attenuate the incoherent light, and
wherein the second optical filter is configured to transmit the laser light and the incoherent light.

(Item 9)
The defect inspection apparatus as recited in any one of the aforementioned Items 1 to 8,
wherein the control unit is configured to differentiate timing of causing the imaging unit to image the laser light by causing the first irradiation unit to emit the laser light and timing of causing the imaging unit to image the incoherent light by causing the second irradiation unit to emit the incoherent light.

(Item 10)
The defect inspection apparatus as recited in the aforementioned Item 9,
wherein the control unit is configured to cause the imaging unit to image the incoherent light by causing the second irradiation unit to emit the incoherent light in a state in which an operation of the displacement unit is suspended.

(Item 11)
The defect inspection apparatus as recited in any one of the aforementioned Items 1 to 10, further comprising:
a display unit configured to display an image,
wherein the control unit is configured to perform control of displaying on the display unit the surface layer inspection image configured to be able to visually recognize a position determined as a position of a defective part occurred inside the measurement region and control of displaying on the display unit the appearance inspection image configured to be able to visually recognize a position determined as a position of a defective part occurred on an outer surface of the measurement region.

(Item 12)
The defect inspection apparatus as recited in the aforementioned Item 11,
wherein the control unit is configured to perform control of displaying on the display unit an image emphasizing the position determined to be the position of the defective part occurred inside the measurement region by superimposing the image on the appearance inspection image.

(Item 13)
The defect inspection apparatus as recited in the aforementioned Item 11 or 12,
wherein the control unit is configured to perform control of displaying the surface layer inspection image and the appearance inspection image side by side on the display unit.

(Item 14)
The defect inspection apparatus as recited in any one of the aforementioned Items 1 to 13,
wherein the control unit is configured to cause the interfered laser light and the incoherent light reflected at the measurement region to be imaged by a common imaging unit.

(Item 15)
The defect inspection apparatus as recited in the aforementioned Item 14,
wherein the interference unit includes a common optical member arranged on the optical path of the laser light and the incoherent light,
wherein the optical member includes an optical filter that transmits light having a predetermined wavelength, and
wherein the interfered laser light and the incoherent light reflected at the measurement region have a wavelength capable of passing through the common optical filter and are configured to be imaged by the common imaging unit.

(Item 16)
The defect inspection apparatus as recited in any one of the aforementioned Items 1 to 13,
wherein the imaging unit is configured to include a first imaging unit configured to image the laser light and a second imaging unit provided separately from the first imaging unit and configured to image the incoherent light.

(Item 17)
The defect inspection apparatus as recited in any one of the aforementioned Items 1 to 16,
wherein the incoherent light is configured to include light having a wavelength of red color, light having a wavelength of green color, and light having a wavelength of blue color.

(Item 18)
The defect inspection apparatus as recited in any one of the aforementioned Items 1 to 17,
wherein the second irradiation unit is configured to emit the incoherent light by reducing coherence of the laser light emitted by the first irradiation unit.

The invention claimed is:
1. A defect inspection apparatus comprising:
a displacement unit configured to displace a measurement region of an inspection target;
a first irradiation unit configured to emit laser light to the measurement region;
a second irradiation unit configured to emit incoherent light defined as light which is incoherent to the measurement region;
a control unit configured to control irradiation by the first irradiation unit and the second irradiation unit;
an interference unit configured to cause interference of the laser light reflected at the measurement region by laser interferometry; and an imaging unit configured to image the interfered laser light and the incoherent light reflected at the measurement region, wherein a surface layer inspection image which is an image representing displacement of the inspection target in the measurement region is generated based on an intensity pattern of the interfered laser light imaged by the imaging unit, and an appearance inspection image which is an image of an outer surface of the measurement region is generated based on an intensity pattern of the incoherent light imaged by the imaging unit.

2. The defect inspection apparatus as recited in claim 1, wherein the interference unit includes a common optical member arranged on an optical path of the laser light and the incoherent light.

3. The defect inspection apparatus as recited in claim 1, wherein the second irradiation unit is configured to emit the incoherent light including light having a wavelength equal to a wavelength of the laser light emitted by the first irradiation unit.

4. The defect inspection apparatus as recited in claim 1, wherein the laser interferometry is a method that causes interference of the laser light reflected at mutually different two points of the measurement region, and wherein a part of an optical path of the laser light and a part of an optical path of the incoherent light are configured to be common.

5. The defect inspection apparatus as recited in claim 4, further comprising:

a blocking unit configured to block either one optical path of mutually different two optical paths through which the laser light reflected at the mutually different two points passes, wherein the control unit is configured, in a state in which either one optical path of the two optical paths is blocked by the blocking unit, to cause the imaging unit to image the incoherent light by causing the second irradiation unit to emit the incoherent light using the other optical path.

6. The defect inspection apparatus as recited in claim 4, further comprising:

a reflecting mirror member arranged on an optical path through which the laser light passes, wherein the control unit is configured to cause the imaging unit to image the incoherent light by emitting the incoherent light in a state in which either one optical path of the mutually different two optical paths through which the laser light reflected at the mutually different two points passes is changed by changing a position of the reflecting mirror member.

7. The defect inspection apparatus as recited in claim 4, wherein the imaging unit is configured to image the incoherent light reflected at the mutually different two points, and wherein the control unit is configured to perform image processing of reducing blurring on a blurred appearance inspection image generated based on an intensity pattern of the incoherent light reflected at the mutually different two points.

8. The defect inspection apparatus as recited in claim 4, wherein the interference unit is configured to include a first optical filter that transmits light having a predetermined wavelength on one of the mutually different two optical paths through which the laser light and the incoherent light reflected at the mutually different two points commonly pass and a second optical filter that transmits light having a predetermined wavelength on the other of the mutually different two optical paths, wherein the first optical filter is configured to transmit the laser light and attenuate the incoherent light, and wherein the second optical filter is configured to transmit the laser light and the incoherent light.

9. The defect inspection apparatus as recited in claim 4, wherein the control unit is configured to differentiate timing of causing the imaging unit to image the laser light by causing the first irradiation unit to emit the laser light and timing of causing the imaging unit to image the incoherent light by causing the second irradiation unit to emit the incoherent light.

10. The defect inspection apparatus as recited in claim 4, further comprising:

a display unit configured to display an image, wherein the control unit is configured to perform control of displaying on the display unit the surface layer inspection image configured to be able to visually recognize a position determined as a position of a defective part occurred inside the measurement region and control of displaying on the display unit the appearance inspection image configured to be able to visually recognize a position determined as a position of a defective part occurred on an outer surface of the measurement region.

11. The defect inspection apparatus as recited in claim 4, wherein the control unit is configured to cause the interfered laser light and the incoherent light reflected at the measurement region to be imaged by a common imaging unit.

12. The defect inspection apparatus as recited in claim 4, wherein the imaging unit is configured to include a first imaging unit configured to image the laser light and a second imaging unit provided separately from the first imaging unit and configured to image the incoherent light.

13. The defect inspection apparatus as recited in claim 4, wherein the incoherent light is configured to include light having a wavelength of red color, light having a wavelength of green color, and light having a wavelength of blue color.

14. The defect inspection apparatus as recited in claim 4, wherein the second irradiation unit is configured to emit the incoherent light by reducing coherence of the laser light emitted by the first irradiation unit.

15. The defect inspection apparatus as recited in claim 1, wherein the control unit is configured to differentiate timing of causing the imaging unit to image the laser light by causing the first irradiation unit to emit the laser light and timing of causing the imaging unit to image the incoherent light by causing the second irradiation unit to emit the incoherent light.

16. The defect inspection apparatus as recited in claim 15, wherein the control unit is configured to cause the imaging unit to image the incoherent light by causing the second irradiation unit to emit the incoherent light in a state in which an operation of the displacement unit is suspended.

17. The defect inspection apparatus as recited in claim 1, further comprising:

a display unit configured to display an image, wherein the control unit is configured to perform control of displaying on the display unit the surface layer inspection image configured to be able to visually recognize a position determined as a position of a defective part occurred inside the measurement region and control of displaying on the display unit the appearance inspection image configured to be able to visually recognize a position determined as a position of a defective part occurred on an outer surface of the measurement region.

18. The defect inspection apparatus as recited in claim 17, wherein the control unit is configured to perform control of displaying on the display unit an image emphasizing the position determined to be the position of the defective part occurred inside the measurement region by superimposing the image on the appearance inspection image.

19. The defect inspection apparatus as recited in claim 17, wherein the control unit is configured to perform control of displaying the surface layer inspection image and the appearance inspection image side by side on the display unit.

20. The defect inspection apparatus as recited in claim 1, wherein the control unit is configured to cause the interfered laser light and the incoherent light reflected at the measurement region to be imaged by a common imaging unit.

21. The defect inspection apparatus as recited in claim 20, wherein the interference unit includes a common optical member arranged on an optical path of the laser light and the incoherent light, wherein the optical member includes an optical filter that transmits light having a predetermined wavelength, and wherein the interfered laser light and the incoherent light reflected at the measurement region have a wavelength capable of passing through the common optical filter and are configured to be imaged by the common imaging unit.

22. The defect inspection apparatus as recited in claim 1, wherein the imaging unit is configured to include a first imaging unit configured to image the laser light and a second imaging unit provided separately from the first imaging unit and configured to image the incoherent light.

23. The defect inspection apparatus as recited in claim 1, wherein the incoherent light is configured to include light having a wavelength of red color, light having a wavelength of green color, and light having a wavelength of blue color.

24. The defect inspection apparatus as recited in claim 1, wherein the second irradiation unit is configured to emit the incoherent light by reducing coherence of the laser light emitted by the first irradiation unit.

* * * * *